United States Patent [19]
Alliston

[11] 3,919,720
[45] Nov. 11, 1975

[54] NUCLEAR POWER PLANT TRAINING SIMULATOR MODELING ORGANIZATION AND METHOD

[75] Inventor: William H. Alliston, Murrysville, Pa.

[73] Assignee: Westinghouse Electric Corporation, Pittsburgh, Pa.

[22] Filed: Feb. 23, 1973

[21] Appl. No.: 335,295

[52] U.S. Cl. .......................... 444/1; 176/19; 35/13
[51] Int. Cl..... G06f 15/06; G06f 15/56; G09b 9/00
[58] Field of Search ........... 444/1; 235/184; 176/19, 176/24; 35/10, 13, 10.2

[56] References Cited
UNITED STATES PATENTS
3,061,945  1/1962  Hawkins ................................. 35/10
3,237,318  3/1966  Schager ................................. 35/10

OTHER PUBLICATIONS
Reactor Simulator Tuilizing a Vacuum; Harry Reese, Jr.; RCA Technical Notes, RCA TN No.: 493, Sept. 1961.
Dynamic Simulation of a Fast Reactor; R. G. Olson, Nucleonics, May, 1957; pp. 76–79.
An Electronic Reactor Simulator; Ross Cameron & D. A. Austio, Nuclear Power; Apr., 1957; pp. 146–151.
PWR Training Simulator; J. P. Franz & W. H. Alliston; Nucleonics, May, 1957; pp. 80–83.

Primary Examiner—Charles E. Atkinson
Assistant Examiner—Edward J. Wise
Attorney, Agent, or Firm—H. W. Patterson

[57] ABSTRACT

A training simulator for the full-scope real-time dynamic operation of a nuclear power plant utilizes apparatus that includes control consoles having manual and automatic devices corresponding to simulated plant components and indicating devices for monitoring physical values in the simulated plants. A digital computer configuration is connected to the control consoles to calculate the dynamic real-time simulated operation of the plant in accordance with the simulated plant components to provide output data including data for operating the control console indicating devices. The plant simulation is modularized into various plant components or component systems. Simulated plant components or component systems are described by a mathematical equation embodied in a computer program which accepts data from other simulated plant components or systems, calculates output values including values which are used as inputs for simulator calculators by other simulated plant components or systems, and responds in a manner similar to that of its corresponding physical entity in both transient and steady states.

112 Claims, 11 Drawing Figures

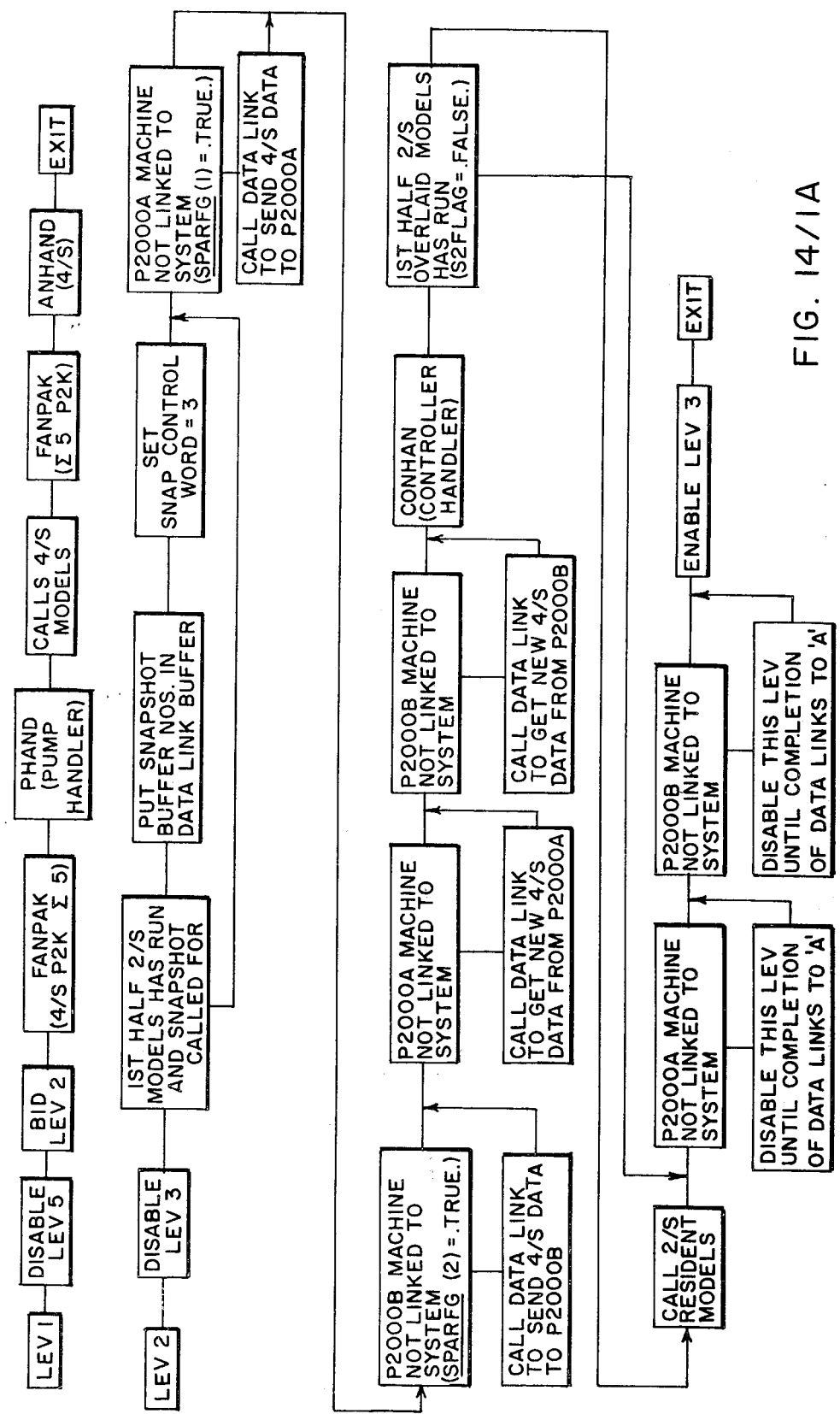
FIG. 14/1A

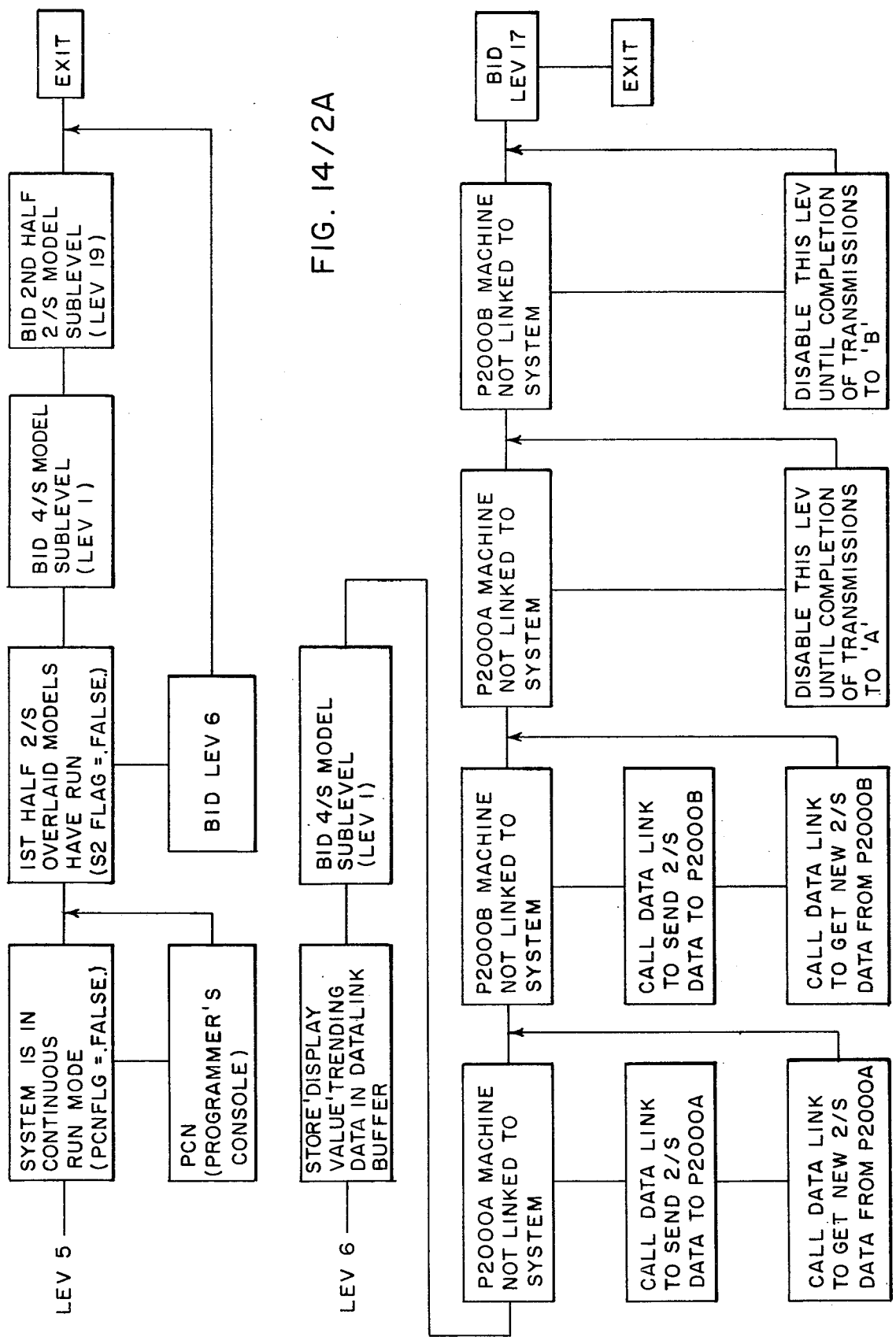
FIG. 14/2A

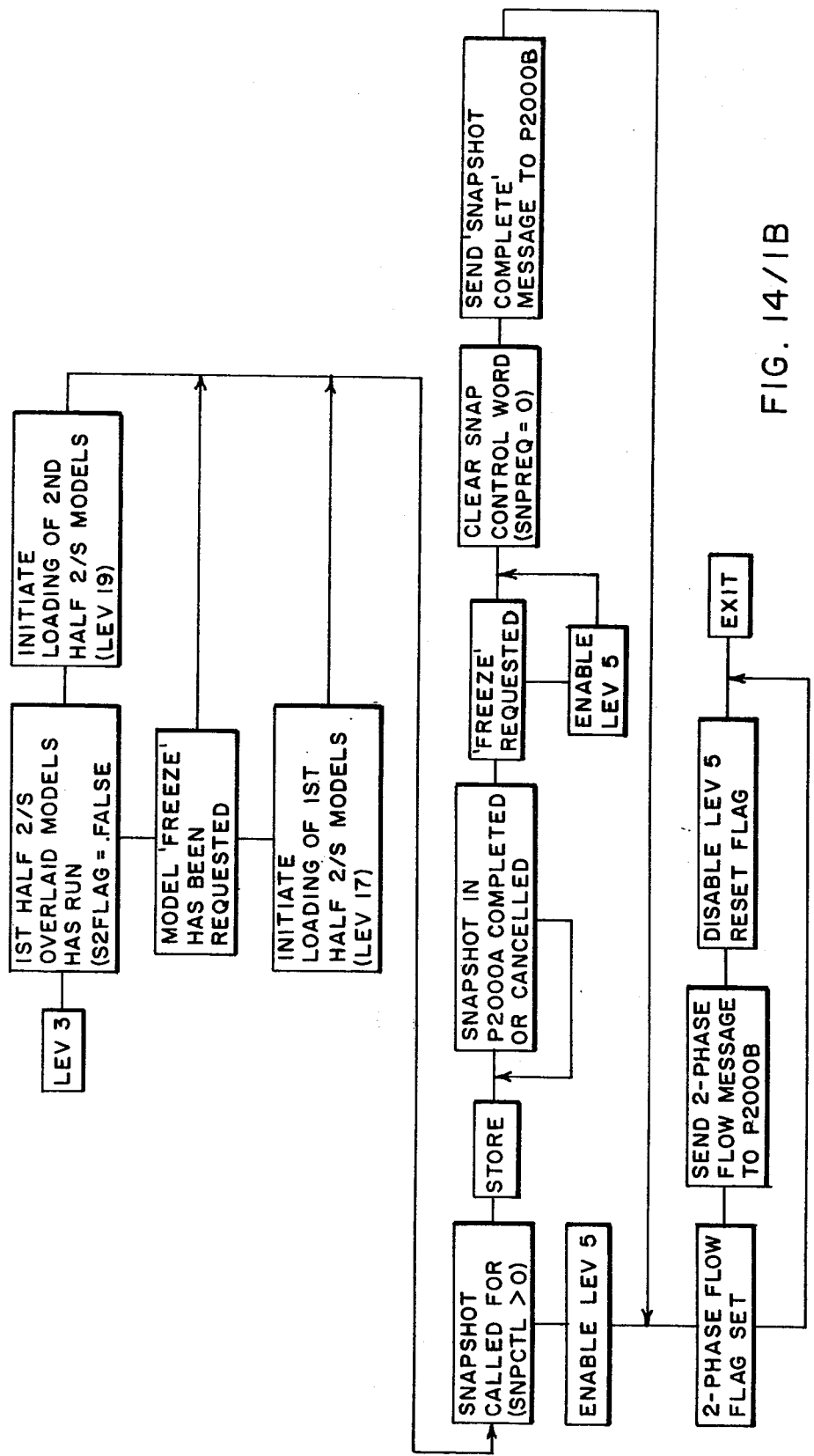

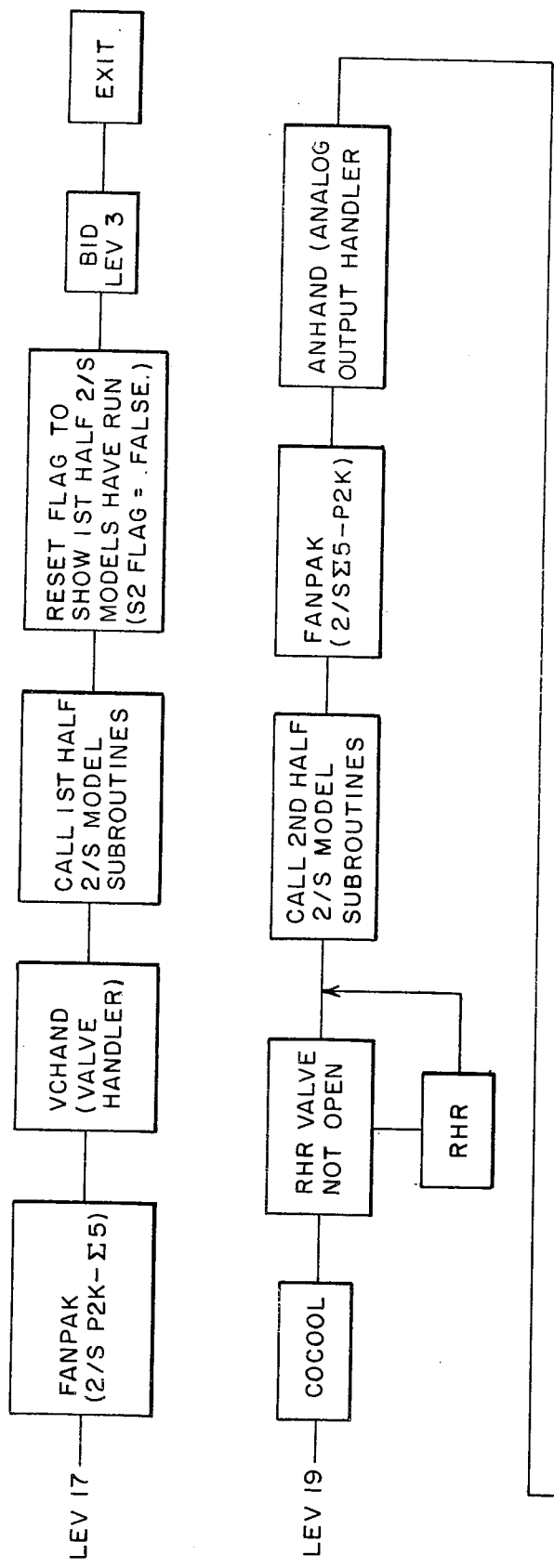
FIG. 14/2B

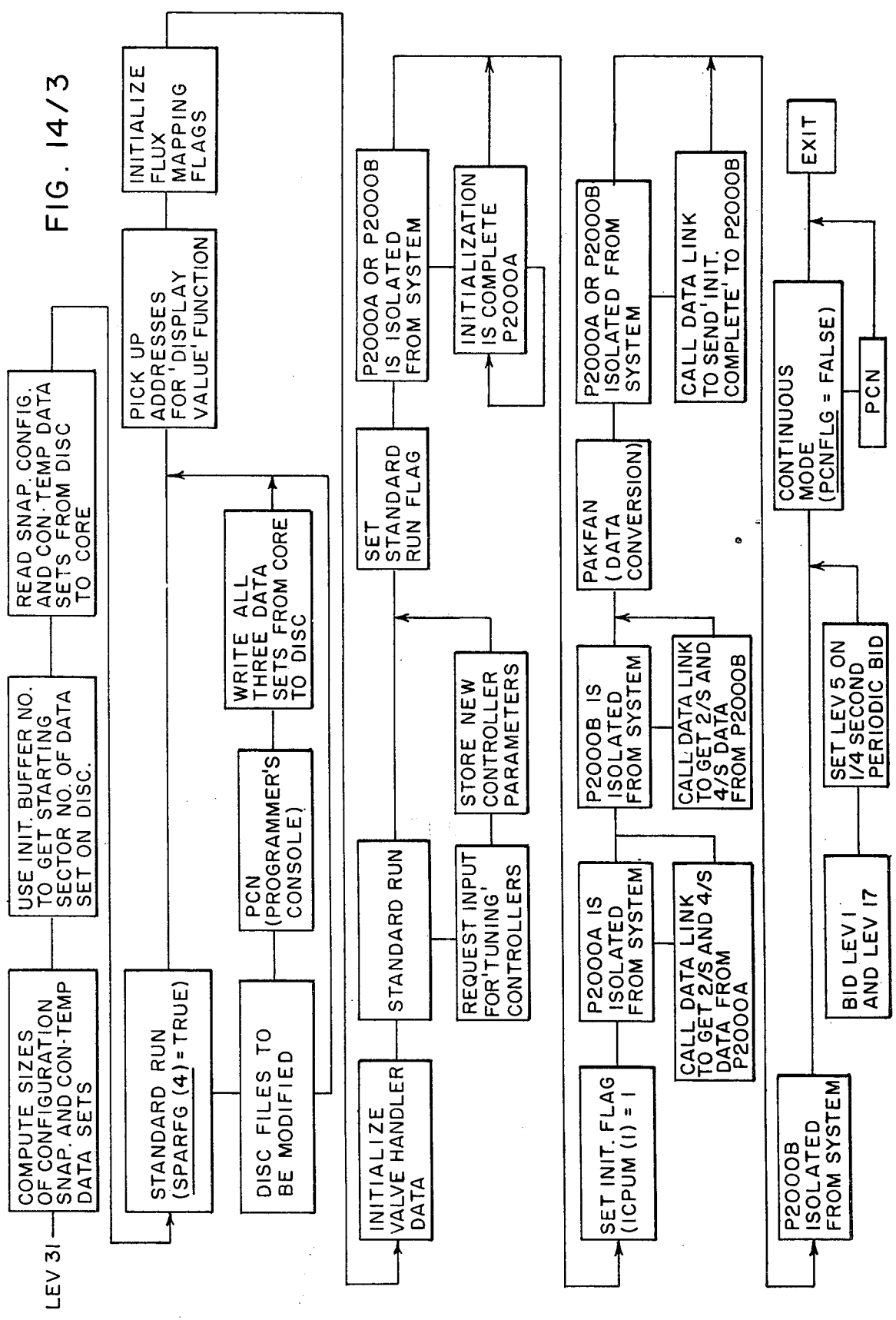
FIG. 14/3

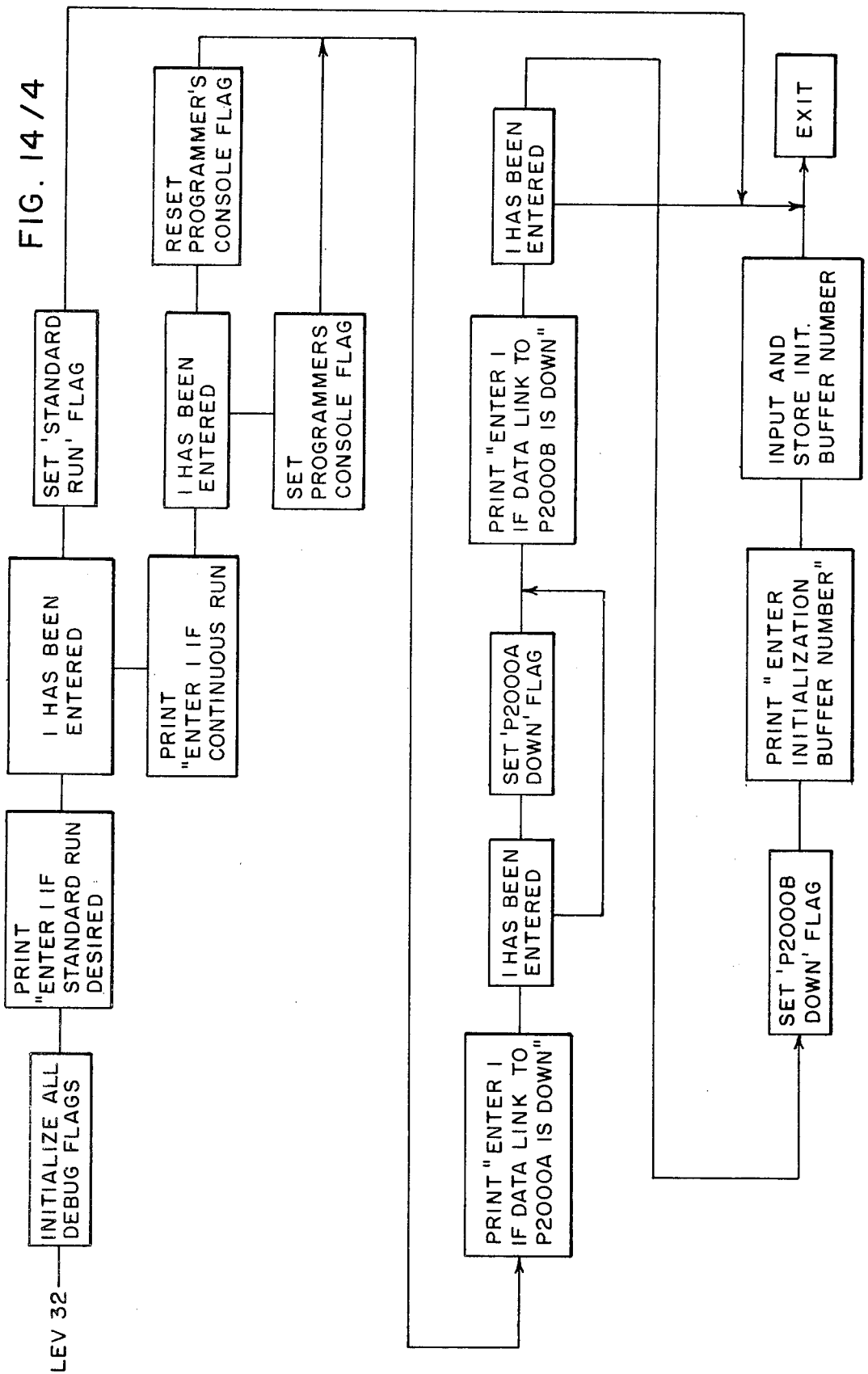

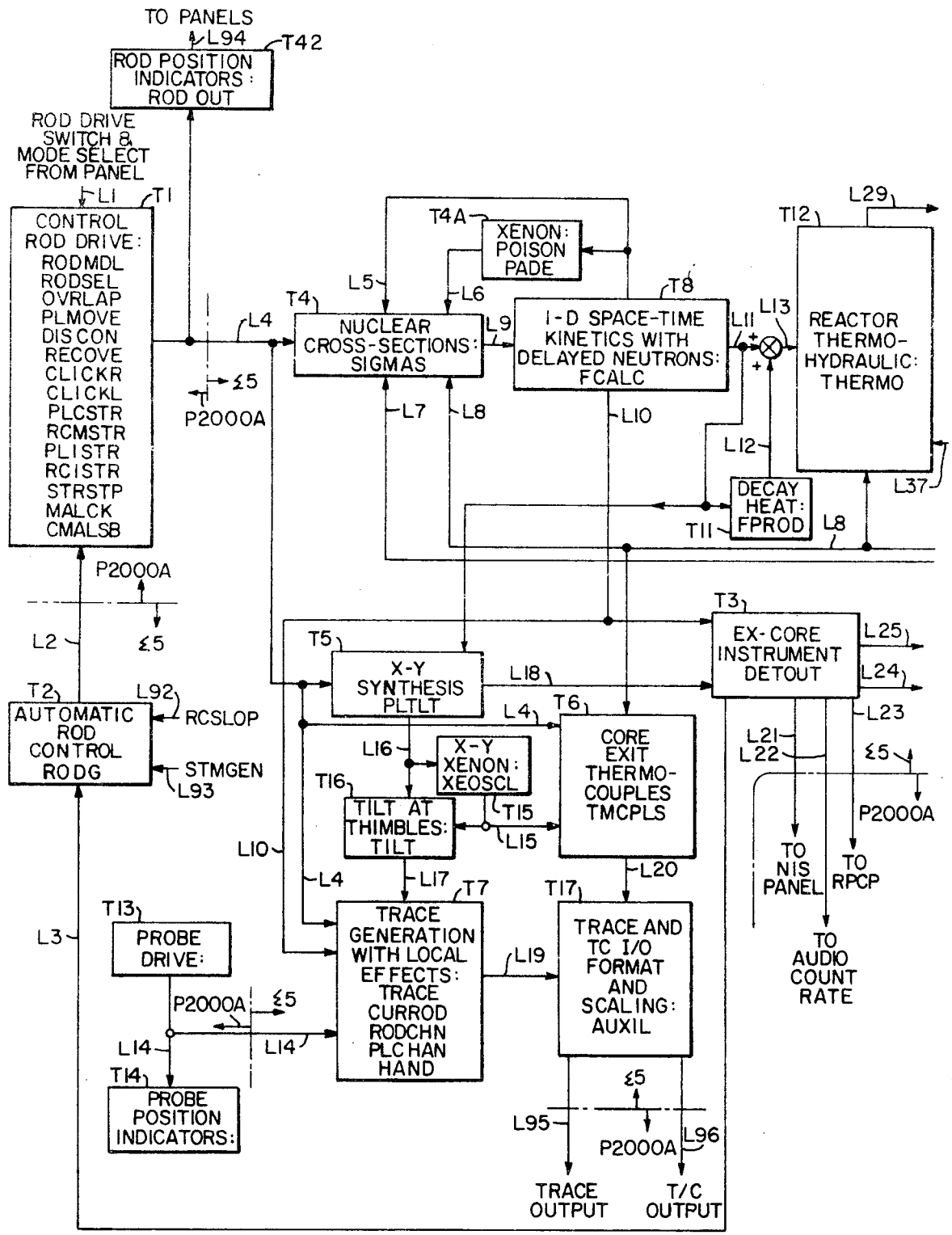
FIG.95/1A

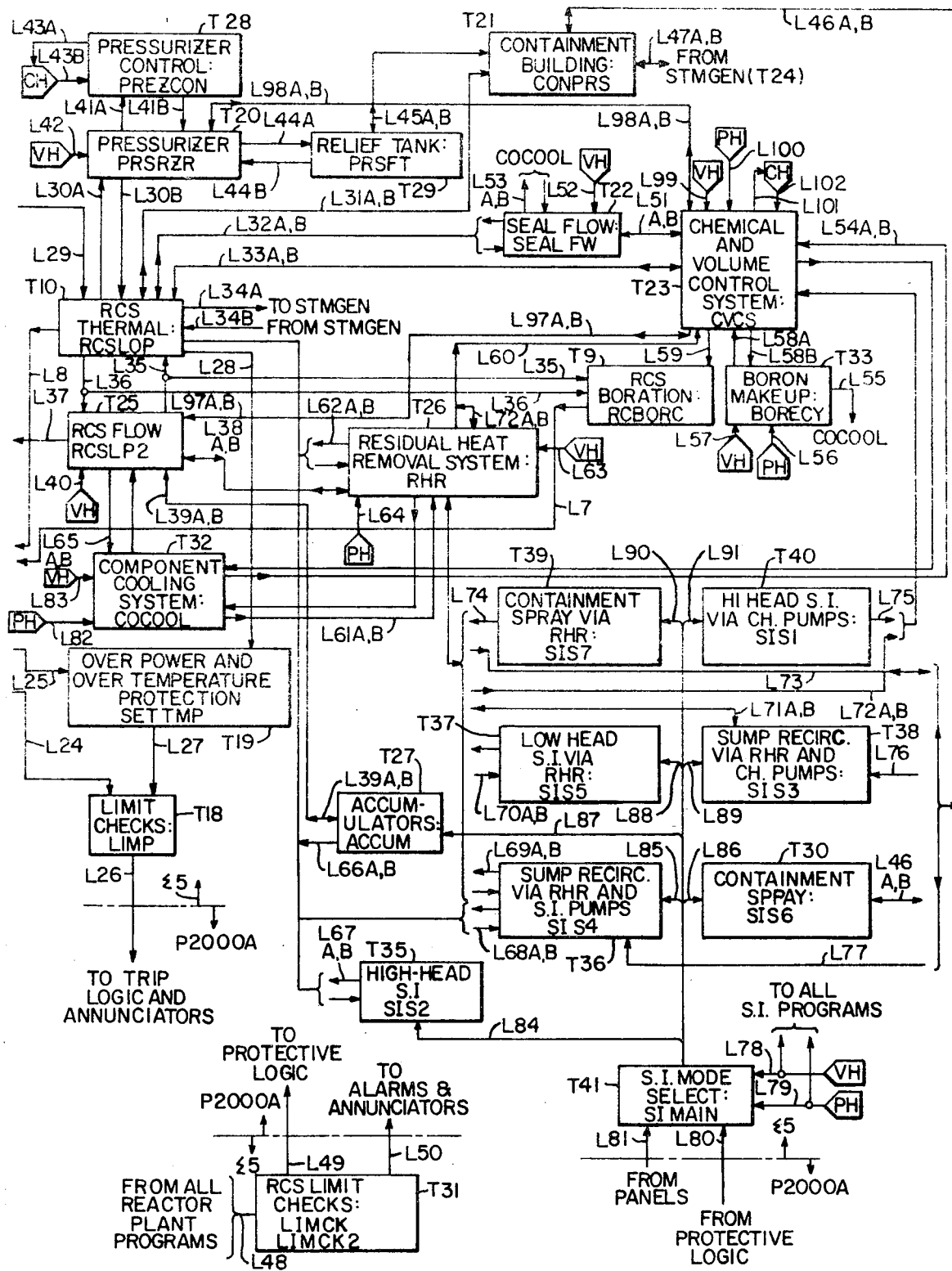
FIG.95/IB

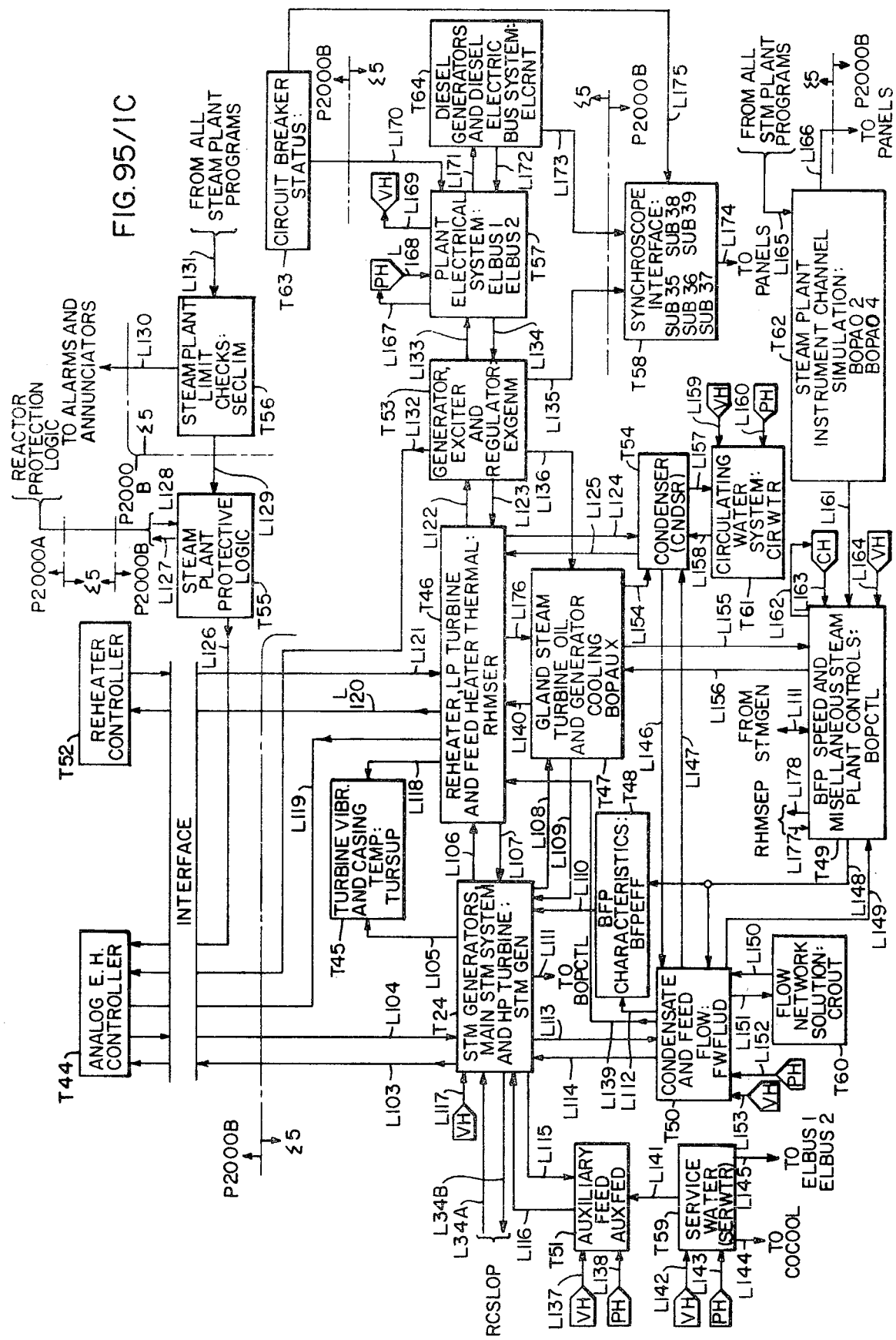
FIG. 95/1C

NUCLEAR POWER PLANT TRAINING SIMULATOR MODELING ORGANIZATION AND METHOD

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola filed Feb. 23, 1973 in U.S. Pat. Office.
2. Ser. No. 335,286 entitled "Nuclear Power Plant Training Simulator System And Method" and filed by R. W. Ferguson and R. E. Converse filed Feb. 23, 1973 in U.S. Pat. Office.
3. Ser. No. 335,181 entitled "Training Simulator For Nuclear Power Plant Reactor Monitoring" and filed by W. H. Alliston, F. R. Czerniejewski and B. A. Mutafelija filed Feb. 23, 1973 in U.S. Pat. Office.
4. Ser. No. 335,288 entitled "Training Simulator For Nuclear Power Plant Reactor Control Model And Method" and filed by F. R. Czerniejewski filed Feb. 23, 1973 in U.S. Pat. Office.
5. Ser. No. 335,294 entitled "Training Simulator For Nuclear Power Plant Reactor Coolant System And Method" and filed by W. H. Alliston and A. A. Desalu filed Feb. 23, 1973 in U.S. Pat. Office.
6. Ser. No. 335,285 entitled "Engineered Safeguards Systems And Method In Nuclear Power Plant Training Simulator" and filed by A. A. Desalu filed Feb. 23, 1973 in U.S. Pat. Office.
7. Ser. No. 335,391 entitled "Fluid Distribution Network And Steam Generators And Method For Nuclear Power Plant Training Simulator" and filed by W. H. Alliston, S. J. Johnson and B. A. Mutafelija filed Feb. 23, 1973 in U.S. Pat. Office.
8. Ser. No. 335,183 entitled "Training Simulator And Method For Nuclear Power Plant Heater And Non-Linear Modeling" and filed by B. A. Mutafelija filed Feb. 23, 1973 in U.S. Pat. Office.
9. Ser. No. 335,293 entitled "Secondary System Modeling And Method For A Nuclear Power Plant Training Simulator" and filed by S. J. Johnson filed Feb. 23, 1973 in U.S. Pat. Office.
10. Ser. No. 335,184 entitled "Data Communication And Method For Real-Time Plural Computer Configuration" and filed by F. G. Willard, N. Slavin and L. S. Schmitz filed Feb. 23, 1973 in U.S. Pat. Office.

BACKGROUND OF THE INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then it is unlikely that he would observe the effect of important malfunctions and be able to take the best corrective procudures.

Although simulators have been used for many years, in power plant design, it is only recently that they have been used for power plant operator training. An article in the July 22, 1968 issue of Electrical World, entitled "Nuclear Training Center Using Digital Simulation" briefly describes the installation of a boiling water reactor plant simulator. An article in the same publication in the Oct. 6, 1969 issue entitled "Huge Simulator To Ready More Reactor Operators" discusses the proposed installation of a pressurized water reactor simulator. In Volume 10, No. 5 of the publication "Nuclear Safety" published during September and October 1969 is an article entitled "Training Nuclear Power Plant Operators With Computerized Simulators," and in the June 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances, and process control in another.

Full-scope simulators, which involve the entire range of operation under normal, abnormal and emergency conditions; and simulate the entire plant from the reactor to the generator including all the auxiliary systems, involve in the neighborhood of from 4000 to 5000 contact inputs and outputs, and require thousands of calculations every fraction of a second. Thus, the organization and method for calculating the simulated operation becomes of paramount importance.

Further, the full-scope simulation of a nuclear power plant for operator training is of such extensive scope that it is advantageous to provide as many modeling simplifications as possible within the limits of steady state and transient accuracy. The mathematical modeling of a nuclear power plant is concerned with material, energy and volume balances, which often result in mathematical variables such as temperature, pressure, material flows and flow rates, concentration of materials, specific volumes and enthalpies, mechanical speeds, vibrations, electrical current, voltage and frequency, etc. The wide variety of components in a nuclear power plant to be simulated promotes the use of a modular approach. Such an approach is suggested in a conference paper published by the Institute of Electrical and Electronic Engineers entitled "Mathematical Modeling For Power Plant Operating Simulators" written by W. H. Alliston et al. In addition, this paper points out some of the problems that arise with respect to the mathematical modeling of nuclear power plants simulators for training operators, and suggests proposed solutions.

For both the benefit of the builder of the simulator, and the eventual user, it is advantageous to relate each of the modules insofar as possible to the physical system being simulated. This organization makes it convenient to relate a given section of the programming or simulation to a physical entity while the simulator is in use. Also, a "building block" approach can be taken to construct the simulator, wherein modules corresponding to additional components can be added with the performance of each being verified in combination with the remainder of the system as it is placed into the combination. In addition, each module's performance can be individually checked out prior to adding it to the overall system. In many instances, the module verification or test can be made to match a test actually performed on the corresponding physical device such that the modular test results can be evaluated by direct comparison with results from the actual component test. In the modularization of the simulator, it is advantageous to divide the simulation into modules in such a way as to minimize communication between individual modules. In most cases, modules organized on a system functional basis render a corresponding minimum communication between modules; however, a module covering the steam generators, main steam and high pressure turbine is more efficient than a separate module for each of the components or subsystems.

In modular design organization, the time sequence used for the processing of the modules must be considered. In most cases, it is possible to process the modules in a normal sequential order; and for the subject simulator, module processing can be started with the reactor modules and proceed through the primary system, steam plant and electrical system. However, in some instances, it is advantageous to depart from the preceding straight-forward order of processing. For example, where external closed control loops are involved using analog controllers and hence, analog to digital and digital to analog conversion, excessive time lags can be introduced into the control loops if the analog outputs and inputs are grouped into modules and processed at one time point each.

In addition to the system function level modules of the simulation, a further level of modularity for components is mechanized for use within such functional system modules. These are termed component level modules and cover the physical components such as pumps and valves, and strictly simulation components such as analog output. These modules are programmed in a set of special handlers that include a valve handler, pump handler, controller handler, and an analog output handler. Such a component modular mechanization centralizes the programming for similar devices and thereby saves computer storage. It also aids in centralizing communication, since most of these component modules have similar communication requirements; such as the valve operating switch position which must be connected to the valve handler module for the valve. One of the main advantages of the component level model mechanization is that it permits facility in selective processing. For example, components such as valves are manually operated from the control panels. If no action is taken by the operator at the panels, the simulated valve is also inactive. Thus, at any given time only a very few of the valves and similar components would be expected to be in a state of change. The modular mechanization at this level renders it easy to selectively process only those components that are changing, thus saving a large amount of computer time by not processing inactive elements. In the case of analog outputs, all the elements are processed, but use of a modular mechanization allows advantage to be taken of sequential addressing, which is more efficient than random addressing. It also provides for centralized processing of such functions as scale selection and zero suppression.

Further modularization is advantageous on the service level. For example, such modularization includes the generation of such functions as steam and water properties and solutions of network equations. Mechanization of modules for these functions permit centralization of processing solutions of network equations; and the generation of functions which are used by other modules of the simulation. Mechanization of modules for service level functions permit centralization of programming that provides a further saving in computer storage for both program material and data.

Each one of the modules, in addition to corresponding valves and switches, produces physical output variables for operating the indicating devices on the control panel. However, in organizing the modules, and in keeping in mind the minimum communcation between individual modules, the particular individual physical variables which are input to other modules becomes of paramount importance.

SUMMARY OF THE INVENTION

In accordance with the broad principles of the present invention, a real-time dynamic simulator of a full-scope nuclear power electrical generating plant consists of mathematical models that are modularized in such a manner to minimize the communication between such models; and so constructed that the input and output variables that are accepted and calculated by respective individual models provide relative simplicity, reliability, stability and accuracy of operation. Such principles are broadly characterized by an overall organization wherein reactor modeling provides variables corresponding to reactor enthalpy for use in the simulation of a reactor coolant system, which generates data corresponding to fluid temperature for use in the simulations of the steam turbine that in turn generates turbine speed for use in a module that simulates the main generator. In one area of the simulation, such principles are broadly characterized by a model organization wherein a three-dimensional reactor portion of the simulation is modularized to include a separate nuclear cross-section model, a space-time kinetic model, synthesis model, and a reactor thermal-hydraulic model. In another area, the thermocalculations of a reactor coolant system are modularized separately from the flow calculations and such coolant system with separate boric acid calculations and boric acid make-up models. Also, each of the safety injections systems are modularized on a functional basis. In another area, such characterization includes a single model that simulates that portion of the system which includes the steam generators and main steam pressure and high pressure turbines; and another single model is utilized to simulate the low pressure turbine, reheater, and feedwater thermal calculations.

BRIEF DESCRIPTION OF THE DRAWINGS

FIGS. 14/1A through 14/4 inclusive show the flow charts for the simulator programs operation of the C machine;

FIGS. 95/1A, 95/1B, and 95/1C is a functional block diagram illustrating the interconnections of the various individual modules that make up the simulator.

GENERAL DESCRIPTION OF SIMULATED NUCLEAR POWER PLANT

Figure 1:
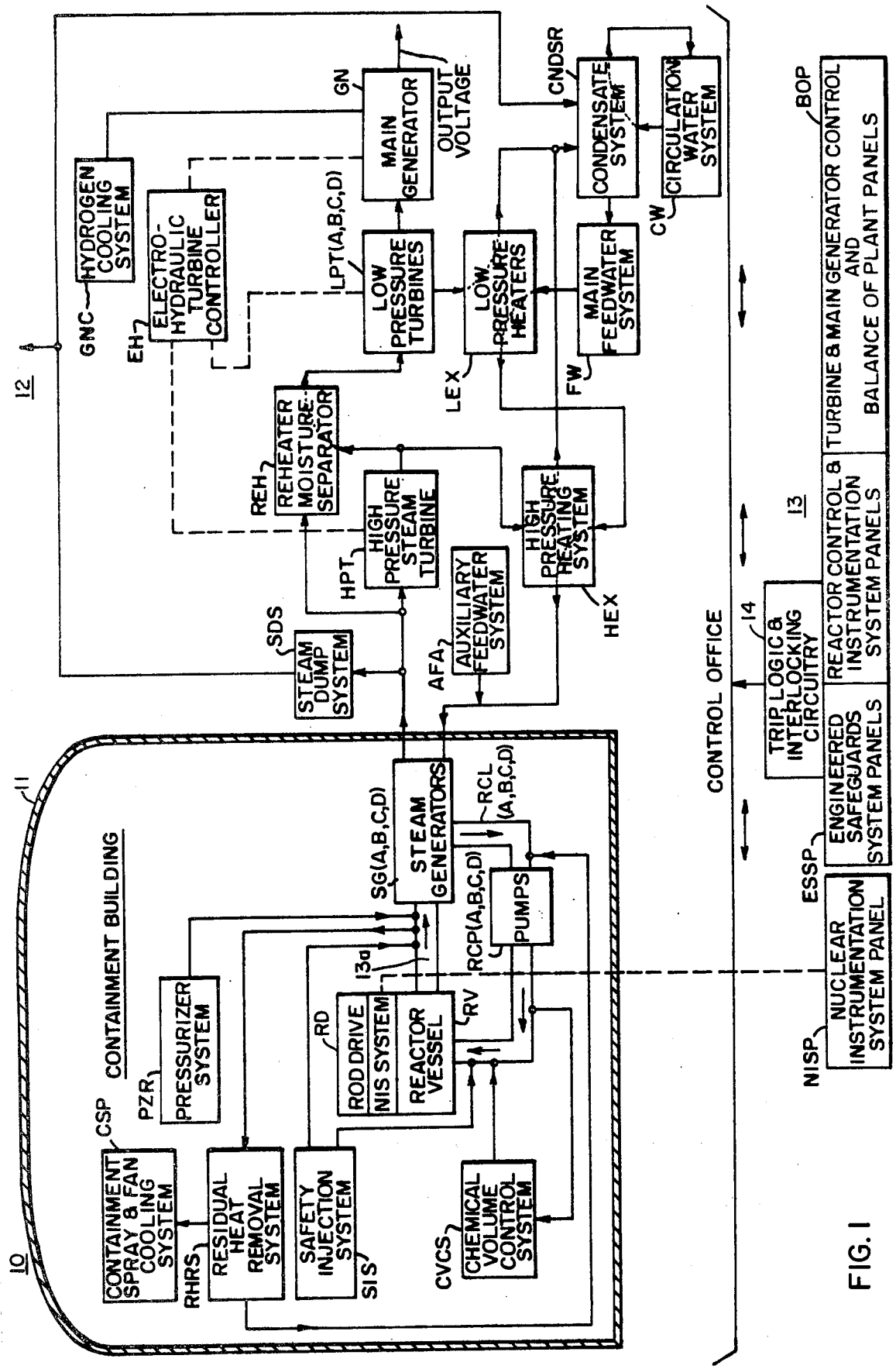
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurized system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressuriztion of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large reactor coolant pumps RCP.

The residual heat removal system RHRS portion of the engineered safeguard systems ESS transfer heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additonal dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressure is measured and used as a load measurement for use in reactor control.

On leaving the last row of high pressure blades, the steam has a moisture content of approximately 10 percent. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10 percent of the flow which is extracted as moisture. The remaining 90 percent flows through steam heated reheater portion of REH where it receives approximately 100F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
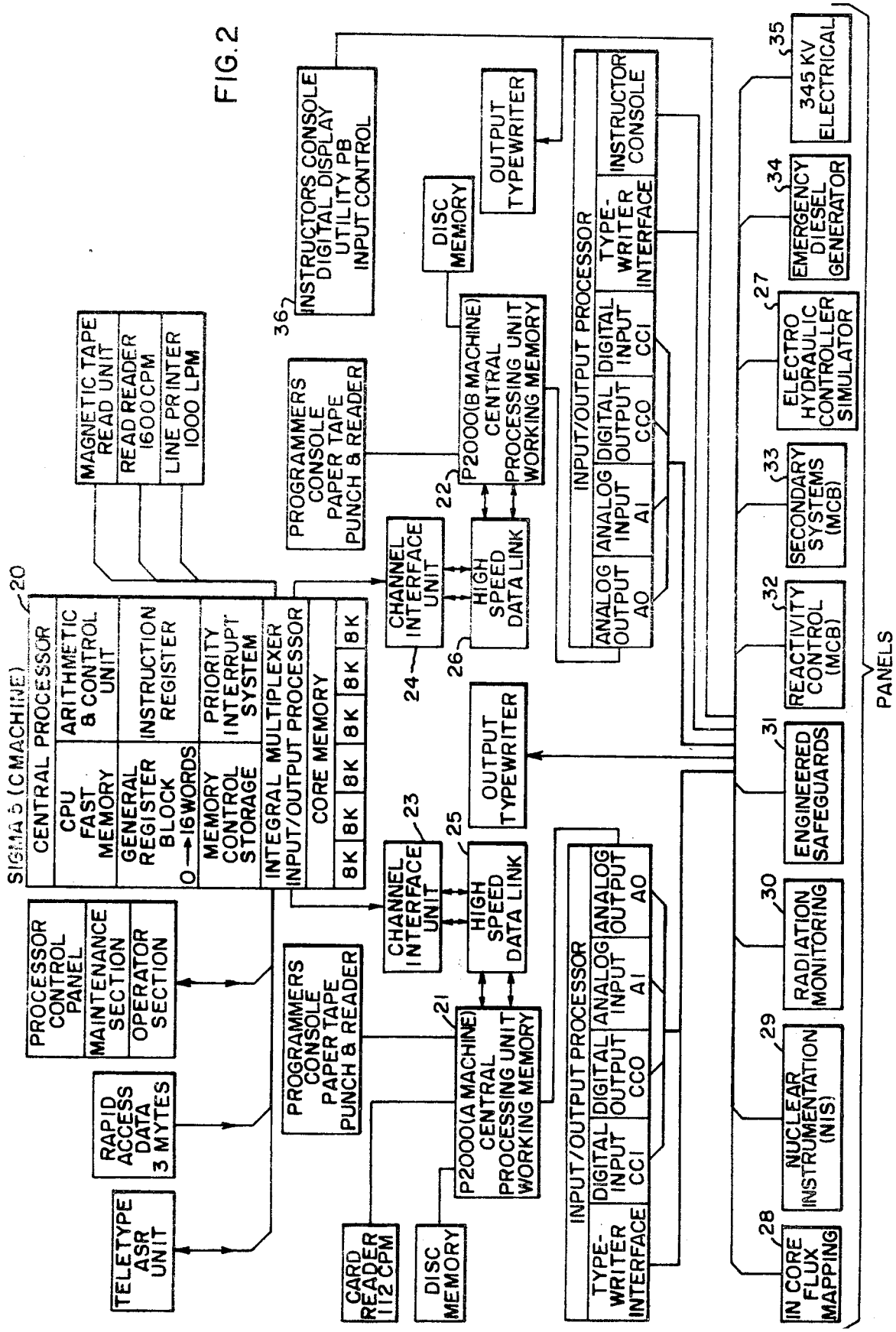
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the C machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

C MACHINE SIMULATOR PROGRAMS

Figure 13:
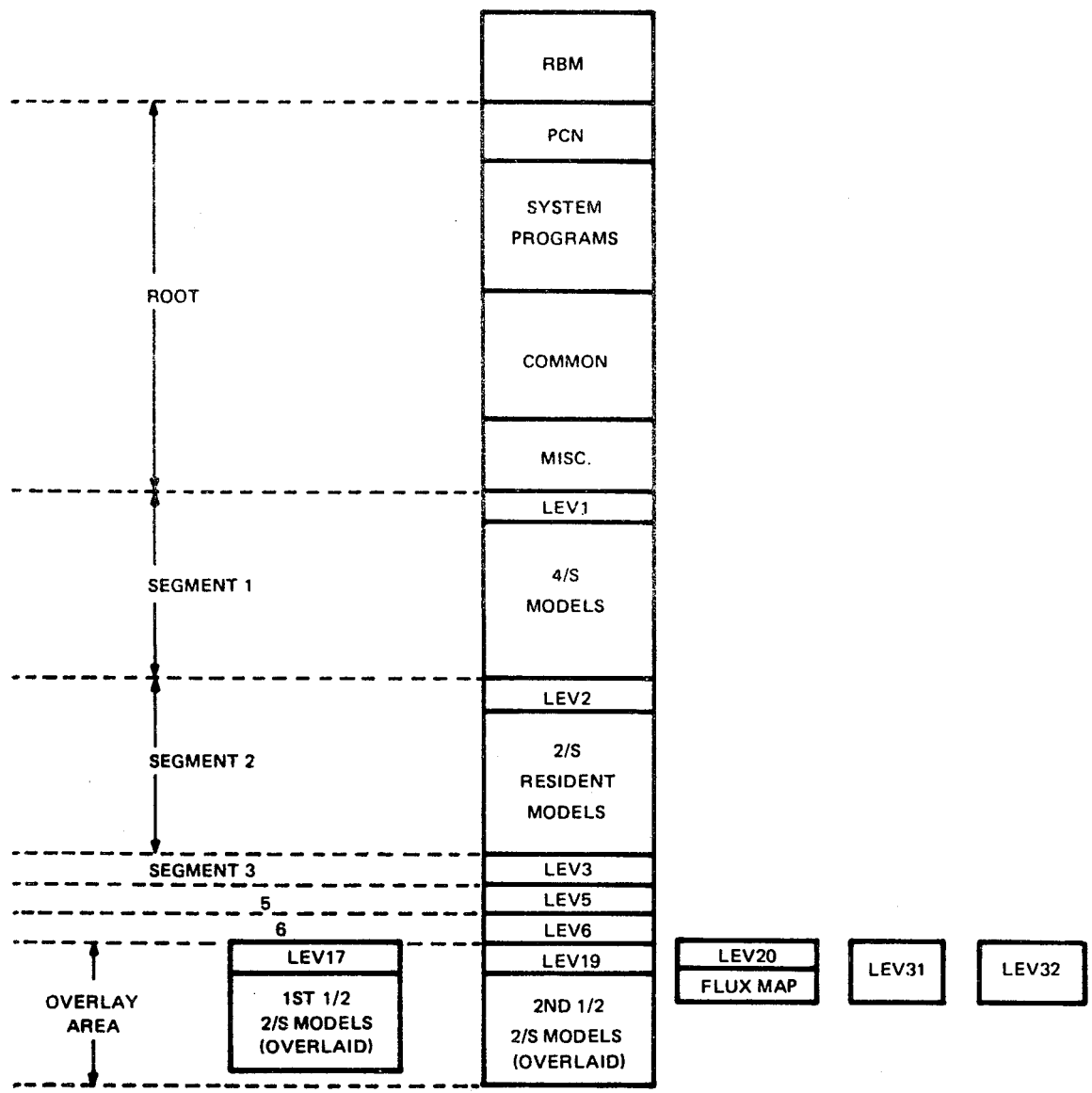
FIG. 13 illustrates the core diagram of the C machine.

Referring to FIG. 13, the core diagram of the Sigma 5 or C machine shows the sublevels LEV1, LEV2, LEV3, LEV5, LEV6, LEV17, LEV19, LEV20, LEV31, and LEV32 which are handled by the sublevel processor for the C machine program system which in this embodiment provides most of the simulation or modeling of the nuclear power gnerating apparatus (FIG. 1) 1). Each sublevel includes respective calling subroutines LEV which perform subroutine calls and function calls to the sublevel processor, data link handler, and disc handler. The sublevel calling routines LEV are executed in a fixed order based on a one quarter second period. The programs in the plant model or simulation program system, invention, are called by the aforementioned sublevel calling routines. Some of the model programs are executed on every run or cycle of the sublevel processor, that is, every one quarter second (4/S models); and other model programs are executed on every other run or cycle, that is, every one-half second (2/S models). Other models are non-periodic, and are executed only in response to a specific set of input conditions.

The 4/S model subroutines, which are called from LEV1, and are always resident in core, are as follows:

| THERMO | FCALC |
| BOP | DETOUT |
| BOPAOA | XETOUT |
| STMGEN | CHAMBR |
| RHMSEP | PLTLT |
| BOPCTL | RODGO |
| ELCRNT | SETTMP |
| SECOND | RCSLOP |
| PADE | RCSLP2 |
| HWATER | PREZCON |
| SIGMAS | PRSRZR |
| TWATER | EXGENM |
| HWPSAT | |

The 2/S models, are segregated into resident and non-resident groups. The resident 2/S models which are called from LEV2 are as follows:

| AUXFED | SIS2 |
| ACUMM | SIS3 |
| SIMAIN | SIS4 |

-continued

| CONPRS | SIS5 |
| FWFLUD | SIS6 |
| SIS1 | SIS7 |

The 2/S models which are non-resident are in turn segregated into two halves, which each half executing on alternate runs. The first half of the non-resident 2/S models, which are called by LEV17 are as follows:

| AUXIL | LIMP |
| HAND | RCBORC |
| POISON | PRSRFT |
| FPROD | CVCS |
| RADMON | BORECY |
| TMCPLS | SEALFW |

The 2/S models which comprise the second half and are called by LEV19 are as follows:

| COCOOL | BFPEFF |
| RHR | CIRWTR |
| LIMCHK | SERWTR |
| BOPAO2 | SECLIM |
| TURSUP | LIMCK2 |

The non-periodic models that are called or executed only in response to a specific set of input conditions, and are called by LEV20, are as follows:

| TRACE | PLCHAN |
| CURROD | RODCHN |
| TILT | |

In addition to individual models listed above, and referring to the C machine simulator programs operation flow chart of FIGS. 14/1 through 14/4, the pump handler routine PHAND is activated from LEV1 prior to calling the 4/S models on every run of the cycle. The routine PHAND controls all of the simulated plant coolant pumps, except where noted herein. Subsequently, when LEV2 is active the subroutine CONHAN is executed, which routine operates all of the simulated apparatus controllers in the system, prior to calling the 2/S resident models. When level 17 is active, the subroutine VCHAND is executed, which subroutine controls all of the simulated plant valves except as hereinafter noted, just prior to calling the first half of the 2/S model non-resident subroutines.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

ORGANIZATION OF MODELS

Figure 95:
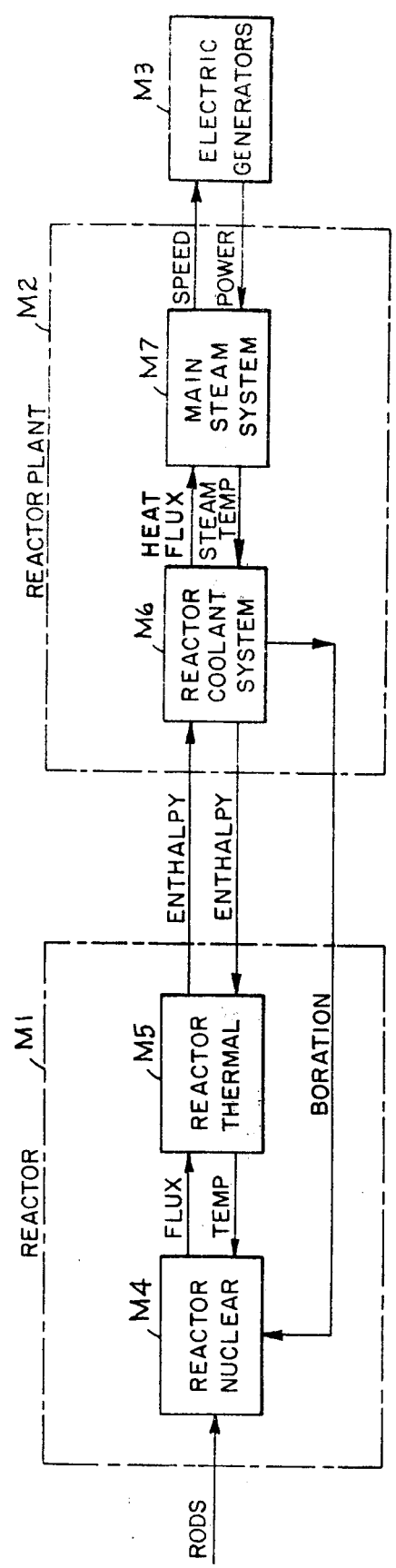
FIG. 95 is a functional block diagram showing the interconnection of the reactor, the primary, and secondary system of the simulation.

To provide realistic simulation in an efficient manner while providing for manufacturing and operating flexibility, the simulated nuclear electrical generating plant is preferably modularly organized and it includes broad components. As shown in FIG. 95, the first category M1 includes the reactor per se, the second category M2 includes the reactor plant, and the third category M3 includes the electrical generators. The reactor category M1 is further modularly segregated into two interacting models, a reactor nuclear model M4 and a reactor thermal model M5. The reactor plant category M2 is further modularly segregated into two interacting models, a reactor coolant system model M6 and a main steam system model M7.

Broadly, in this embodiment of the simulator and with reference to the pressurized water type of nuclear plant being simulated in this case, the reactor nuclear model M4 calculates the neutron flux, as governed by the position of the simulated neutron absorbing control rods M5 and the output coolant temperature of the reactor thermal model M5. The reactor thermal model M5 operates on factors related to heat generation and heat flow to calculate the enthalpy of the reactor as well as the primary coolant temperature. The coolant temperature is output to the reactor nuclear model M4 since coolant temperature affects reactivity and the reactor enthalpy is output to the reactor coolant system model M6 since the reactor enthalpy affects heat transfer to the coolant. The reactor thermal model M5 performs its calculations as governed by the output coolant enthalpy of the reactor coolant system model M6, since the coolant enthalpy affects heat flow from the reactor to the coolant as well as the temperature of the coolant, and the neutron flux of the reactor nuclear model M4, since the flux level is a determinant of the reactor heat generation.

In the reactor plant simulation, the reactor coolant system model M6 calculates coolant enthalpy and secondary heat flux as governed by the reactor enthalpy from the reactor thermal model M5 and the steam temperature from the main steam system M7. The main steam system model M7, which includes the turbine, calculates the main steam temperature and the speed of the turbine, which is governed by the heat flux from the reactor coolant system M6 and the power output of the electric generators M3. The power output of the electric generators is calculated in accordance with the speed of the turbine from the main steam system M7. The reactor coolant system model M6 also calculates the boration concentration which is utilized as an input to the reactor nuclear model M4 to modify the flux calculation. The simulation is further modularized in accordance with the succeeding discussion.

Referring to FIGS. 95/1A, 95/1B, and 95/1C, which provide greater detail for the arrangement of FIG. 95, each of the various models of the modularized simulator system according to the present embodiment of the invention is shown as an individual block having identified therein the computer subroutine or subroutines which structurally and functionally constitute the model or system module. The models generally correspond to functional parts of the simulated plant and they are appropriately interconnected to form the overall model, and they are coupled externally of the computer to the control panels by inputs and outputs referenced in such FIGS. as L1 through L178 inclusive to provide for instructor and operator interfacing. A list of the various models together with reference numerals are contained in the Appendix.

The blocks bearing the designation VH represent the valve handler program VCHAND that responds to the manipulation of the panel controls for operating the valves of the system. The blocks bearing the designation CH represent the controller handler program CONHAN that responds to the operation of the auto-manual controllers on the panels; and the blocks PH represent the pump handler program PHAND that is governed by the pump control switches on the panels. Thus, the programs VCHAND, CONHAN and PHAND provide simulation elements, i.e., valves, controllers and pumps, which are distributed throughout the model organization for interaction with the various system modules in accordance with their functional roles.

The appropriately labeled dashed lines intersecting the input and outputs L designate those functions that occur or are calculated in the Sigma 5 digital computer or C machine or one of the P2000 computers A or B as the case may be. As previously described, certain of the models are calculated four times per second or every cycle; other models are calculated two times per second or every other cycle; and some are calculated on demand or in response to the manipulation of an appropriate control. In this section of the specification, the individual models and their interaction are described and the reasons for the presence of such models and that interaction are made more apparent-esewhere herein.

Referring to FIG. 95/1A, control rod drive model T1 (A machine), which provides a continuous variable truncation approximation for neutron absorbing control rod positions and indications, operates in response to inputs L1 which include the full length and part length rods in and out panel switches, the rod control mode select position, the rod start up reset pushbutton, the trip and trip reset pushbuttons, permissive interlock pushbuttons, (see RCS panels FIG. 92) and rod disconnect switch positions (see NIS panel FIG. 90). Input L2 is also applied to the model T1 and, it comprises rod speed and direction in the automatic mode from an automatic rod control model RODGO(T2), which calculates a transform approximation of the Automatic Rod controller.

Automatic Rod Control model T2 operates in response to input L3 comprising the nuclear power rate which is the output from the EX-CORE instrument model DETOUT, which calculates the meter output from the Ex-Core nuclear chambers, referred to at model T3. The 15 rod bank and/or group positions, and the 10 malfunction rod positions, which are calculated in the model T1, form an input L4 from T1 to the nuclear cross-section model (SIGMAS) T4, which provides the 1½ energy group cross-sections.

L4 is also applied as an input to the X-Y synthesis model PLTLT, which calculates neutron flux vector components, referred to as T5; core exit thermocouples model TMCPLS, which calculates the average channel with local tilt and rod factors, referred to as T6; and the trace generation model T7 which provides the numerical flux fit for In-Core traces. The model T4 responds to the neutron flux input (22 mesh points) L5 which is calculated in the one dimension space time kinetics with delayed nuetrons model FCALC referred to at T8. The T8 output L5 is also the input to the xenon model (POISON, PADE) T4A which provides the analytic solution for Xenon for input L6 to the model T4. Also, the model T4 has applied to it the reactor boron concentration represented by input L7 from the output of the model RCS boration (RCBORC) referred to at T9, which integrates boron inflow and outflow to obtain net boron concentration in the RCS and isolated loops. The model T4 also receives the output L8 from model RCS thermal (RCSLOP) T10, which calculates enthalpy distribution around the RCS loops, the reactor core inlet enthalpy and the average exit enthalpy. The model T4 acts on inputs L4, L5, L6, L7, and L8 to produce 22 diffusion coefficients, 22 absorption cross-sections, 18 neutron yields, 18 energy yields, and 22 neutron velocities which are input as L9 to the one dimension space time model T8.

In addition to the output L5, the model T8 provides 22 neutron flux calculations over output L10 to the input of the models T3 and T7. Also, the model T8 produces the total fission power (output L11) which is used in the calculation of the X-Y Synthesis model T5 and the decay heat (FPROD) model T11, which calculates the eight fission products, one node heat generation. The total fission power at output L11 is summed with the calculated decay heat power at output L12 from the model T11 to produce the total core power as an input L13 to the reactor thermal hydraulic (THERMO) model T12. The latter model calculates reactor flow and heat transfer.

The probe drive model T13 provides output-L14 to the probe position indicators on the NIS panel (see FIG. 90) and also provides an input to the model T7 which comprises thimble selection and the probe position in the thimble, of which there are six maximum. The X-Y xenon (XEOSCL) model T15 provides an output to the model T6 and the planar tilt at the thimbles (TILT) model T16 which comprises two X-Y xenon tilt component factors. The calculations of the model T16 and the model T15 operate on two X-Y gross flux tilt component factors from the output L16 of the model T5. The model T16 in response to the inputs L15 and L16 calculates the X-Y tilt factor at each thimble location for output on L17 to the model T7. The model T5 also provides X-Y tilt factors at each Ex-Core chamber location (output L18) for the model T3.

The Trace Generation model T7 in response to the inputs L17, L4, L10, and L14 produces output L19 the flux trace at each selected thimble up to 6 maximum for input L19 to the trace and TC input/output format and scaling (AUXIL) model T17. The points on each trace are output at L19 sequentially; that is, one point at a time corresponding to the probe position. A total of 120 points is supplied for each complete trace. The model T6 in response to the inputs L8, L4, and L15 produces at its output L20 the temperature at a selected thermocouple which is input into the model T17.

The model T3 calculates the flux at the Ex-Core chamber location for the source, intermediate, and power range meters of the NIS panel (see FIG. 90) over output L21; the source range reciprocal count rate for the auto count rate meter over output L22, which reciprocal is coded as a 16-bit binary number and is output on 16 output contacts; and on output L23, the total neutron and delta flux for each long ion chamber location for the power range control panel. The model T3 also calculates over output L24 the total neutron flux for each long ion chamber location and the rod drop differentiator signal for the limit check (LIMP) model T18 which checks the limits of the parameters for the trip logic and annunciators on the control panel. Also, the flux at each half chamber location, which there are a total of eight, is applied from T3 as an input L25 to the overpower and overtemperature protection (SETTMP) model T19, which model calculates Z-transforms approximations for DNB protection. The output of the limit checks model T18 comprises alarm and annunciator actuation signals, reactor plant permissive signals, reactor protection trip signal, and reactor rod stop signal represented at L26. The model T19 responds to the input L25 and the input L28 which comprises the loop average temperatures, loop delta temperatures, and system pressures to produce the overpower and overtemperature protection trip signals L27 for input to the limit checks model T18.

The inputs L8, and L13 previously described and the input L37, which represents reactor core fluid flow, are applied to the reactor thermal hydraulic model T12 which in turn generates output L29, i.e., the core outlet fluid enthalpy, for input into the RCS thermal model T10.

The RCS thermal model T10 provides an output L30A which comprises surge flow, surge enthalpy for flow into the pressurizer, spray enthalpy, saturation pressure of the reactor vessel dome, saturation pressure of the reactor outlet, and cold leg pressure at the spray tap point. The output L30A is utilized in the pressurizer (PRSRZR) model T20. The model T20 in turn calculates the simulated coolant branches for normal condition (steam bubble above liquid), solid water condition, empty condition, and special conditions for major loss of coolant. The model T20 produces an output L30B which comprises pressure, and surge enthalpy for flow out of the pressurizer to the RCS thermal model T10.

The RCS thermal model T10 further produces an output L31A to the input of the containment building (CONPRS) model T21 which comprises the reactor coolant system heat loss, the loss of coolant accident outflow and outflow enthalpy. The model T21 calculates containment temperature and pressure based on flow and energy released to the containment building, and it provides an input L31B, which comprises containment temperature and pressure, to the model T10.

The RCS thermal model T10 also produces an output L32A which comprises four pressures at the reactor coolant pumps, four cold leg temperatures of the reactor coolant loops for instances in which the labyrinth seal flow reverses, pressure at the drain header tap points, and the excess letdown enthalpy for use in the seal flow (SEALFW) model T22 which calculates the flows and pressures and temperature distribution in the seals of the reactor coolant pumps. The seal flow model T22 produces an output to the RCS thermal model T10 which comprises four labyrinth seal flows, seal water enthalpy, and the excess letdown flow. The model T10 also produces output L33A, which comprises two letdown tap pressures, and letdown enthalpy to the chemical and volume control system (CVCS) model T23, which calculates the chemical and volume control system pressures, temperatures, enthalpies, and flow distribution.

The RCS thermal model T10 also provides an output 34A, which comprises the steam generator primary average temperatures (4) and four primary pressures for tube leak malfunctions, to the steam generators, main steam system and high pressure turbine (STMGEN) model T24 which simulates the operation of the four steam generators FGA, through SGD. The model T10 receives an input L34B from the model T24 which comprises the steam generator heat flux for the four steam generators and a leak flow for tube leak malfunction. Model T10 also receives inputs L35 which comprise the reactor coolant system loop flows for all locations and produces an output L36 which comprises the reactor coolant specific volumes for all locations from and to RCS flow (RCSLP2) model T25, which calculates the pressure and flow distribution around the RCS loops. The previously described model T9 also receives inputs L35 and L36 from the models T25 and T10, respectively.

The RCS flow model T25 produces an output L37 which comprises the reactor core flow to the previously described model T12. Model T25 also produces an output L38A which comprises the residual heat removal system pressures at selected tap points; and receives inputs L38B which comprise the residual heat removal flows to and from residual heat removal system (RHR) model T26, which in turn simulates the behavior of the residual heat removal system in its normal use. Inputs L39A to the model T25 comprises safety injection tap point pressures and output L39B from the model T5 comprises the safety injection flows L39A and L39B couple the model T25 with the accumulator (ACCUM) model T27, which simulates the accumulator dump during safety injection, pressurization or depressurization of the accumulators with nitrogen, the accumulator drain to the volume control tank and drain tank, and the filling of the accumulators. The model T25 also receives input L40 which comprises 8 main turbine stop valve admittances and 4 bypass valve admittances from the valve handler program VH.

The previously described pressurizer model T20 provides output L41A which comprises the pressurizer level and pressurizer pressure to pressurizer control (PREZCON) model T28, which calculates protection logic and control signals, spray flow, pressurizer heater power, and relief flow with associated malfunctions. In turn, the model T28 provides output L41B which comprises the pressurizer heater power to the model T20. The valve handler provides input L42 which comprises 3 spray valve admittances, relief valve admittance, and safety valve admittance to the model T20.

When the pressurizer control model T28 is on automatic, an error is fed to the controller handler (not shown), which in turn feeds valve commands to the valve handler. The resulting spray valve admittances are sent to the model T20. The controller handler receives from the model T28 the pressurizer level error and the pressurizer pressure error 43A. Bifurcated control is employed; that is, low pressure actuates the pressurizer heaters while high pressure actuates the spray.

The control handler provides an input L43B to the pressurizer control model T28 which comprises the heater power control signal. The spray valve control output goes direct from the controller handler to the valve handler; and the level control output goes directly to the positive displacement pump speed calculation or to the charging flow valve controller, depending on whether the positive displacement or centrifugal charging pumps are in use. The model T20 provides an output L44A which comprises relief line flows and relief fluid enthalpy to the relief tank (PRSFT) model T29 which simulates the pressurizer relief tank. The model T29 in turn provides an output L44B which comprises the pressurizer relief tank pressure to the model T20.

The relief tank model T29 provides an output L45A which comprises the relief tank rupture disk flow and the relief tank rupture disk flow enthalpy to the previously mentioned containment building model T21. The model T21 in turn provides an output L45B which comprises containment pressure and containment temperature for heat loss to the relief tank model T29.

The model T21 provides an output L46A which comprises containment pressure to the containment spray safety injection system (SIF6) model T30. The model T30 in turn provides an output 46B which comprises containment spray flow and containment spray enthalpy to the model T21. Also, the model T21 provides an output 47A to the steam generator model T24 which comprises the containment pressure. The steam generator model T24 provides an output 47B to the model T21 which comprises the steam break flow, steam break enthalpy, feedwater line break flow, and feedwater line break enthalpy.

Outputs L48 comprises all plant variables in the simulator for which limit checks are to be performed. Also, output L49 from RCS limit checks (LIMCK, LIMCK2) model T31 provides all limit check logicals from the reactor coolant system to the protection logic. The model T31 further provides output L50 which comprises all limit check logicals from the reactor coolant system to the alarms and annunciators on the control panel.

The chemical and volume control system model T23 previously mentioned provides an output 51A which comprises pressure at the seal header on the charging line, enthalpy at the seal header on the charging line, and the charging pump suction line pressure below the valve LCV112C to the previously mentioned seal flow model T22. In turn, the model T22 provides output L51B which comprises the seal header flow, the seal return flow including excess letdown flow, and the temperature of the seal water return flow to the model T23.

The seal flow model T22 receives input L52 which comprises all seal flow system valve admittances from the valve handler program. The model T22 provides an output 53A which comprises the component cooling water return temperature from the seal water heat exchanger and the component cooling water return temperature from the excess letdown heat exchanger to component cooling system (COCOOL) model T32, which calculates the flow and pressure distribution in the component cooling system as well as the thermal dynamic behaviour of the residual heat removal heat exchangers. Also, in the model T32 the component cooling surge tank level is calculated based on water density changes. The model T32 provides and output L53B which comprises the component cooling water flow and temperature to the seal water exchanger, and the component cooling water flow and temperature to the excess letdown heat exchanger for input to the seal flow model T22.

The chemical and volume control model T23 provides an output L54A which comprises the component cooling water return temperature from the letdown heat exchanger to the model T32. In return, the model T32 provides an output L54B which comprises the component cooling water flow and temperature to the letdown heat exchanger for input to the model T23.

The boron makeup (BORECY) model T33, which simulates the systems associated with boric acid makeup, including the boron evaporators, boric acid storage tanks and transfer pumps, and the boric acid blender and associated valves and piping, provides an output L55 which comprises the component cooling water heat load from the boron evaporator condenser to the component cooling system model T32. Also, the pump handler provides an output L56 which comprises the boric acid pump shutoff heads for fast and slow speeds to the model T33. The valve handler provides an output L57 for the model T33 which comprises admittances for all boron makeup system valves. The model T33 also has an output L58A, which comprises the boric acid blender outflow to the charging pump suction, the blender boron concentration, the blender outflow to the volume control tank spray line, direct boration flow to the charging pump suction by way of valve 8100 (concentration is assumed to be 20,000 PPM), and evaporator water flow to the refueling water storage tank, for input to the chemical and volume control system model T23. In return, the model T23 provides an output L55B which comprises charging pump suction pressure and pressure at the volume control tank spray line to the boron makeup model T33. The model T23 also provides an output L59 to the model T9 which comprises the charging flow total into the reactor coolant system for all paths, the charging boron concentration, the fill header flow for each isolated loop, the total letdown flow for all paths from the reactor coolant system, the drain header flow for each isolated loop, and the flow through the deborating demineralizer.

The previously mentioned model T26 provides an output L60 which comprises the pressure at the residual heat removal system letdown line and the temperature at the residual heat removal letdown line to the chemical and volume control model T23. The model T26 also provides an output L61A which comprises the component cooling water return temperatures from the two residual heat removal heat exchangers for input to the component cooling system model T32. In return, the model T32 provides an output L61B which comprises the component cooling water flows and temperature to the two RHR heat exchangers for input to the residual heat removal system model T26. The model T26 includes an output L62A which comprises the residual heat removal enthalpy to the reactor coolant system for input to the previously mentioned RCS thermal model T10. The model T10 in turn provides an output L62B which comprises the reactor coolant system tap point enthalpy returning to the residual heat removal system for input to the model T26. The valve handler has an output L63 which comprises all residual heat removal system valve admittances to the model T26; and the pump handler has an input L64 to the residual heat removal model T26 which includes the two residual heat removal pump heads.

The component cooling system model T32 provides an output L65A to the reactor coolant system flow model T25 which the component cooling water flow to the reactor coolant pump thermal barrier and bearing coolers, and the component cooling water temperature to the reactaor coolant pump cooling. The model T25 in turn provides an output L65B to the model T32 which consist of the reactant cooling pump thermal barrier and motor heat load to the component cooling water.

The accumulator model T27 has an output L66A which comprises the accumulator flows to the reactor coolant system and the accumulator flow temperatures which are assumed fixed to the reactor coolant system for input to the RCS thermal model T10. The accumulator boration if assumed fixed in calculating the change in reactor cooling system boration. The model T10 provides output L66B which comprises the safety injection system tap point pressures for input to the model T27. The model T10 also has an input L67A which comprises the high head safety injection flows and temperature to the reactor coolant system from the high head safety injection (SIS2) model T35, which mechanizes the high head safety injection through the safety injection pumps and the portion of the accumulator fillings. In return, the model T10 provides an output L67B which comprises the safety injection tap point pressures through the model T35. The RCS thermal model T10 also has an input L68A which comprises the safety injection flows and temperatures to the reactor coolant system from the sump recirculation via the residual heat removal and safety injection pumps (SIS4) model T36, which mechanizes recirculation from the sump using the residual heat removal pump, containment pressure, and safety injection pumps. Also, the model T10 provides an output L68B which comprises reactor coolant system pressures to the model T36. The model T36 also provides output L69A which comprises the safety injection pump suction pressure to the residual heat removal system model T26; and the model T26 provides an input L69B to the model T36 which comprises the residual heat removal flow to the safety injection system and the residual heat removal heat exchanger outlet temperature.

The RHR model T26 has an input L70A which comprises tap point pressures from the low head safety injection system via the residual heat removal system (SIS5) model T37, which model mechanizes the low head safety injection through the residual heat removal pumps. The model T26 also provides an input L70B which comprises the residual heat removal to safety injection system flows and the residual heat removal heat exchanger outlet temperatures for input to the model T37. The RHR model T26 also has an input L71A which comprises tap point pressures from the sump recirculation via the residual heat removal and charging pumps (SIS3) model T38 which mechanizes recircualtion from the sump using containment pressure, one residual heat removal pump and the charging pump. The model (SIS3) T38 provides an output L71B which comprises residual heat removal flow to the safety injection system and the residual heat removal temperatures to the safety injection system. The model T26 provides an output L72A which comprises the residual heat removal pump discharge pressure to the model T23 and an input L72B which comprises the charging pump suction pressure from the model T23. The model T26 also has an output L73A which comprises the residual heat removal system flow and temperature to the containment spray system T21.

The model T26 has an input L74 which comprises spray line pressures to the containment spray by way of the residual heat removal system (SIS7) model T39, which mechanizes the containment spray through the residual heat removal system. The model T23 has an input L75 which comprises the pressure at the boron injection tank inlet from the high head safety injection system via the charging pumps (SIS1) model T40, which recognizes the high head safety injection through the two centrifugal charging pumps and a portion of the accumulator filling. In this model the boron injection tank initial boron concentration is assumed fixed. The containment building model CONPRS T21 also provides an output L76 which comprises containment pressure, containment sump enthalpy, and containment sump level to indicate if the sump is dry for input to the model T38 previously mentioned. The model T21 also has an output L77 which comprises containment pressure, containment sump enthalpy and level to the previously mentioned (SIS4) model T36.

The valve handler has an output L78 to all the safety injection models and to the safety injection mode select (SIMAIN) model T41, which is the safety injection calling program. The model T41 also has an input L79 from the pump handler which comprises the safety injection pump heads; an input L80 from the protective logic which comprises the safety injection actuation signal; and an input L81 which comprises the manual safety injection actuation signal and reset signal from the control panels. The manual operation of the safety injection pumps and valves is handled through the pump handler and valve handler respectively, which includes the safety injection test function.

The model T32 receives an input from the pump handler L82 which comprises the component cooling pump heads and an input L83 which includes all component cooling system valve admittances from the valve handler. The model T41 has outputs L84, L85, L86, L87, L88, L89, L90, and L91 to the accumulator model T27 and the safety injection system models T30, and T35 through T40 which comprises an operation bid to the respectively safety injection models. The individual safety injection system models are not computed when inactive. Therefore the output L84 through L91 from the model T41 comprises a logical signal to initiate operation of their respective routines whenever the safety injection select model T41 determines that the proper condition, either automatic or manual, has been set up to commence their operation.

Referring to the automatic rod control model T2 (RODGO) (see FIG. 95/1A), at input L92 which comprises the $T_{Avg}$ for auctioneering is input from the model T10. Also, the model T2 has an input L93 which comprises the turbine impulse pressure from the steam generator model T24 (see FIG. 95/1C). The output L4 from the model T1 is also input to the rod position indicators (RODOUT) model T42, which processes all the information to set up the control board outputs. The panels receive input L94 from the rod position indicator model T42 which comprises the rod counter drive pulses, the trigger rod position signals and the rod bottom light signal. The trace model T17 previously mentioned provides an output L95 which comprises the incore traces of which there are six maximum to the recorders on the NIS panel. The model T17 also produces an output L96 which comprises the thermocouple voltage for a selected thermocouple.

Referring again to the model T25, at input L97A which comprises pressure at the letdown line, pressure at charging line, pressure at fill header, and letdown enthalpy for input to the model T23. The chemical volume control system model T23 has an output L97B which comprises charging flow, charging enthalpy, and fill header flow to the model T25. The CVCS model T23 also has an output L98A which comprises the auxilarly spray flow and enthalpy for input to the pressurizer model T20. In return, the pressurizer model T20 has an output L98B which is the pressurizer pressure for input to the model T23. The model T23 has an input L99 from the valve handler which comprises all chemical volume control system valve admittance; at the input L100 from the pump handler which comprises the centrifugal charging pump heads. The positive displacement pump is calculated separately within the CVCS model T23. The model T23 has an output L101 to the controller handler which comprises an error output for the letdown pressure controller, an error output for the boric acid flow controller, an error output for the seal water flow controller, and an error output for the letdown temperature controller. The error output related to pressurizer pressure and level control are on L43A previously mentioned. The controller handler has an input L102 to the model T23 which comprises the controller output signal for letdown pressure control, boric acid flow control, seal water flow control, and letdown temperature control.

Referring to FIG. 95/1C, the STMGEN model T24 has an output L103 which comprises turbine impulse pressure for use in the analog electrohydraulic controller model T44; and the model T44 has an output L104 which comprises the governor valve positions for input to the model T24. The model T24 has an output L105 which comprises govenor valve positions, high pressure turbine inlet temperature, and high pressure turbine exit temperature for input to the turbine vibration and casing temperature (TURSUP) model T45, which model calculates rotor eccentricity, turbine vibration, vibration and eccentricity phase angle, rotor position, casing position differential expansion, rotor temperature, turbine casing temperature, and roll up and roll down residences.

The model T24 provides an output L106 which comprises the high pressure turbine exit temperature, exit pressure, exit flow, shafts power, extraction flow, and extraction temperature that is input to reheater, LP turbine, feed heater thermal (RHMSER) model T46. The model T46 calculates the low pressure turbine steam flow and acceleration. The model T46 provides an output L107 which is the reheater inlet pressure and turbine shaft speed that is input to the model T24.

The STMGEN model T24 provides an output L108 which is line steam pressure and turbine impulse pressure that is input to the gland steam, turbine oil and generator cooling (BOPAUX) model T47, which simulates the gland steam seal system, the oil pressures in the turbine oil system, and the electrical generator hydrogen cooling system. Output L109 which comprises the gland steam pressures and turbine oil pressure is output from the model T47 to the model T24.

The model T24 has an input L110 which is the turbine feed pump steam flow that is output from the boiler feed pump characteristics (BFPEFF) model T48. The model T48 calculates the total steam flow to the feed pump turbines by considering the hydraulic horsepower requirements and the efficiency of the pump and turbine units. The model T24 has an output L111 which comprises four steam generator level error outputs and the steam dump controller error output that is input to the boiler feed pump speed and miscellaneous steam plant control (BOPCTL) model T49. The model T49 simulates the panel mounted control systems as well as several internal control systems.

The condensate and feed flow (FWFLUD) model T50 which calculates the feedwater systems pressures and flows, has an output L112 that comprises the feedwater flows through the boiler feed pump turbines to determine the turbine load that is input to the model T48. The model T50 has an input L113 from the model T24 which comprises the steam generator pressures; and an output L114 to the model T24 that comprises steam generator feed flows and feed enthalpies.

The auxiliary feed (AUXFED) model T51, which model simulates the auxiliary feedwater systems pressures and flows has an input L115 from the model T24 which comprises auxiliary feed line pressures. The model T51 has an output L116 to the STMGEN model T24 which comprises the auxiliary feedwater flows and enthalpies. The valve handler has an output L117 to the model T24 which comprises all the main stream system valve admittances except the governor valves.

The RHMSEP model T46 previously mentioned has an output L118 which comprises the turbine speed, low pressure turbine steam temperatures (inlet and exit); and the low pressure turbine losses which is input to the model T45. Also, the model T46 has an output L119 to the analog EH controller model T44 that comprises low pressure turbine pressures, inlet temperature, and turbine speed. The output L20 from the model T46 which comprises the reheater temperature is input to the reheater controller T52 on the control panel. The reheater controller T52 has an output L121 to the model T46 which comprises the reheat steam valve position.

The turbine speed output L122 from the model T46 is input to the generator exciter and regulator (EXGEMM) model T53, which model simulates the electrical generator and exciter. In turn, the model T53 has an output L123 to the model T46 which comprises the generator shaft power which is utilized for turbine acceleration calculation in the model T46. Also, the model T46 has an output L124 which comprises the low pressure turbine exit steam flow and enthalpy for input to the condenser (CNDSR) model T54, which model simulates the main condenser in the steam plant. In turn, the model T54 has an output L125 to the model T46 which comprises the condenser pressure and the condenser air quantity which is utilized for windage loss calculation.

The steam plant protective logic in the B machine shown as block T55 has an output L126 to the analog controller T44 which comprises the turbine trip signal and the turbine run back signal. The block T55 also has an output L127 from the B machine which comprises the turbine trip signal for the reactor trip that is input to the reactor protection logic of the A machines. In turn, the reactor protection logic in the A machine has an input through the B machine to the steam plant protective logic T55 which comprises the reactor trip signal and the turbine run back signal (L128). The input L129 to the block T55 which comprises all steam plant limit check signals for the protective logic is output from the steam plant limit checks (SECLIM) model T56, which model checks the limit of the plant process variable for the purpose of annunciation and protection.

The model T56 has an output L130 which comprises the alarm and annunciator inputs from the steam plant limit checks. This output activates the B machine output contacts. The input L131 from all steam plant program to the model T56 includes all steam plant variables for limit checking.

The generator, exciter, and regulator model T53 has an output L132 to the analog controller T44 which comprises the generator megawatt signal and trip signal. Also, the model T53 has an output L133 which comprises the generator terminal voltage that is input to the plant electrical system (ELBUS1, ELBUS2) model T57, which model calculates the logical variables denoting power status in the busses based on the position of the circuit breakers. In turn, the model T57 has an output L134 to the model T53 which comprises the generator megawatt and megavar load. The model T53 also has an output L135 which comprises the generator frequency; that is, shaft speed, for driving the synchroscope that is input to the synchroscope interface represented at block T58. The model T58 comprises logic chains in the B machine that select the correct frequency difference and drives the synchroscope hardware when it is in use. The model T53 also has an output L136 to the previously mentioned model T47 that comprises the generator heat losses for hydrogen cooling.

The inputs 137 from the valve handler to the model T51 are all the auxiliary feed system valve admittances; and the input L138 from the pump handler to the model T51 comprises the motor driven auxiliary boiler feed pump heads.

Referring to the previously mentioned condensate and feed flow model T50, the output L139 to the model T46 comprises the feed and condensate system flows for the calculation of heat energy balances. The input L140 comprises the gland steam pressures and turbine oil pressures for the low pressure turbine to the model T46 is output from the model T47.

The service water (SERWTR) model T59, which simulates the service water system according to the demands on the system and the number of pumps that are running has an output L141 which comprises the service water flow and temperature that is input to the auxiliary feed model T51. The input L142 to the model T59 from the valve handler comprises all service water system valve admittances; and the input L143 from the pump handler comprises the service water pump head.

The service water model T59 has an output L144 to the component cooling system model T32 (see FIG. 95/1D) that comprises the service water flow to the component and temperature to the component cooling heat exchanger. Also, the output L145 from the service water model T59 which comprises the service water pump motor electrical load is input to the model T57.

The condenser model T54 has an output 146 to the model T50 which comprises condenser pressure and hot well temperature. In turn the model T50 has an output L147 to the model T54 which comprises constant condensate flow and hot well level control flow (feed-drain). The model FWFLUD T50 also has an input L148 which comprises the boiler feed pump speed command that is output from the model T49. This boiler feed pump speed command L148 is also input to the model T48. The model T50 also has an output L149 which comprises the hot well level control signal and the condensate pump recirculation flow control signal that is input into the model T49. The input L150 to the model T50 comprises the feed network flows which are obtained from the flow network solution (CROUT) model T60. the model T60 mechanizes the solution of the feedwater network. In turn, output L151 which comprises the feed flow network pressure drop coefficients which are determined from valve admittances is output from the model T50 to the model T60. Inputs L152 and L153, respectively to the model T50 comprises the condensate pump heads and motor driven boiler feed pump heads, and all feed and condensate system valve admittances from the pump handler and the valve handler. The feed valves are commanded directly from the controller handler to the valve handler, which connection is not shown.

Referring to the model T47 previously mentioned, the output L154 which comprises gland steam flows to determine air leakage of the glands is input to the condenser model T54. Also, T47 has an output L155 to the model T49, which output comprises the gland steam condenser pressure and the generator hydrogen temperature. In turn, the BOPCTL model T49 has an output L156 which comprises the gland steam condenser bypass flow control signal and the generator cooling temperature control signal that is input into the gland steam model T47. The condenser model T54 includes an output L157 that comprises the condenser heat load to the circulating water that is input to the circulating water system (CIRWTR) model T61, which model contains the pressure and flow calculations of the circulating water system. In turn, the circulating water system model T61 has an output L158 which comprises the circulating water flow and temperature to the condenser that is input to the model T54. The valve handler and pump handler inputs L159 and L160 comprises all circulating water system valve admittances and circulating water pump heads respectively.

Steam plant instrument channel simulation (BOPAO2, BOPAO4) model T62 calculates the redundant measurements of process variables within the other models. The subroutine BOPAO2 calculates the redundant analog outputs that are updated twice a second while BOPAO4 calculates the four per second redundant analog outputs. Output L161 from the model T62 comprises the feed pump speed signal, steam generator level signals, steam header pressure signal for steam dump control, and steam generator pressure signal for atmospheric relief valve control that is input into the previously mentioned BOPCTL model T49. The model T49 in turn has an output L162 to the controller handler that includes the water feed pump speed error, the steam generator water level control error, steam dump control error, relief valve control error, heater drain tank level error, condensate pump recirculation controller error, gland steam condenser bypass control error, and the generator hydrogen temperature control error. The controller handler has an input L163 to the model T49 which comprises the controller output corresponding to the input L162. L164 is the valve admittances for the miscellaneous steam plant control valve from the valve handler.

The steam plant instrument channel model T62 previously mentioned includes the input L165 that comprises all steam plants variables having instrument outputs. As previously mentioned, the redundant measurements are not included. The redundant instruments outputs are generated within the model T62 from single variables received from the steam plant dynamic programs. The model T62 also has an output L166 which comprises all instrument both meter and recorder outputs to the balance of plant panels. These outputs are scaled.

The plant electrical system model T57 has an output L167 to the pump handler which provides the bus energize status for all electrical busses supplying pumps; and an input L168 from the pump handler which comprises all pump motor load current. the output L169 from the model T57 to the valve handler comprises the bus energize status for all electrical busses supplying motor operated valves.

The model T57 has an input L170 from the circuit breaker status referred to as T63 in the B machine which comprises the circuit breaker open-close status for all plant bus circuit breakers. The model T57 has an output L171 which comprises the diesel-electric megawatt and megavar load to the input of the diesel generator and diesel electric bus system (ELCRNT) model T64.

The diesel generators model T64 simulates three loads of diesel generator operation; that is, not tied to the load, tied to the load, and sharing the load with the main network. The modes of diesel generator operation depend on the breaker position. The model T64 has an output L172 which comprises the diesel generator operating status; that is, running or stopped, thus the voltage available or not for each of the three generators for input to the model T57. Also, the model T64 has an output L173 which comprises the frequency for each generator for the synchroscope drive model T58.

The synchroscope interface model T58 has an output L174 to the panels which comprises four synchroscope frequencies. The frequency is scaled and supplied as an analog output voltage. The voltage is applied to a voltage control frequency generator whose output is amplified to drive the synchroscopes. Contact outputs are set up according to synchroscope status; that is, synchroscope "connected" or "disconnected" and bus breaker open or close. On the diesel panel, contacts also select which of the three synchroscopes is active.

The model T46 has an output L176 to the gland steam model T47 which comprises turbine speed and the turning gear oil pump status. The model T46 also has an output to the model T49 comprising heater drain tank level (L177); and an input L178 from the model T49 which comprises the heater drain tank level control signal.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator.

Reference is made to U.S. Pat. application bearing Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

What is claimed is:

1. An automated training simulator for a nuclear powered electrical generating plant in which a nuclear reactor generates heat that is transferred by a reactor coolant system to operate a steam turbine for operating an electrical generator wherein discrete selected portions of the representative plant are each represented in a model that uses input data generated by other models to generate physical values that are used as input data by still other models, each model responds in a manner similar to the physical portion of the plant that it represents; comprising a control console with a plurality of manually operable and automatic devices which correspond to distinct plant control devices to provide input data to predetermined models;

calculating means which includes sequence controlling means having the following components a. first model means to generate data values relating to the operation of a nuclear reactor including data values relating to reactor coolant enthalpy in response to the operation of selected control rod devices on the console, b. second model means governed by the generated data values of the first model means to generate data values relating to the operation of a reactor coolant system including data values relating to coolant system fluid temperature, c. third model means governed by data values including the reactor coolant system data values to generate data values relating to the operation of a secondary steam system including data values relating to turbine speed and mechanical power, d. fourth model means governed by the generated data values of the second model means to generate data values relating to the operation of an electrical generator including data values relating to generator power output;

and indicating devices governed by predetermined generated data values for monitoring the operation of the representative plant.

2. An automated training simulator according to claim 1 wherein the reactor model means generates data values relating to reactor flux and reactor fluid temperature.

3. An automated training simulator according to claim 2 wherein said calculating means is structured in a programmed digital computer means.

4. An automated training simulator according to claim 1 wherein the reactor coolant system model means generates data values relating to fluid flow and specific volume; and the calculating means further includes a boron calculation model means governed by the generated fluid flow and specific volume data values to generate data values relating to reactor boron concentration; and said reactor model means generates data values relating to reactor coolant enthalpy in response to the boron concentration data values.

5. An automated training simulator according to claim 4 wherein said calculating means is structured in a programmed digital computer means.

6. An automated training simulator according to claim 1 wherein the calculating means further includes a model means to generate data vales relating to the operation of the secondary side of a steam generator, main steam system, and high pressure turbine stage in response to input data values relating to average temperature for the primary side of the representative steam generator.

7. An automated training simulator according to claim 6 wherein said calculating means is structured in a programmed digital computer means.

8. An automated training simulator according to claim 1 wherein said calculating means is structured in a programmed digital computer means.

9. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising a control console with a plurality of manually operable devices corresponding to distinct plant control devices to provide input data to predetermined models, calculating means including sequence controlling means having the following components a. first model means to generate data relating to the average temperature for the primary side of a steam generator, b. second model means to generate data values relating to the dynamic operation of the secondary side of a steam generating means, main steam system, and high pressure turbine in response to data values including the generated average temperature data values;

and indicating means governed by the generated data value of the second model means to indicate the operation of the representative secondary steam system.

10. An automated training simulator according to claim 9; wherein the calculating means further includes means corresponding to a reactor coolant system thermal model for generating data values relating to thermal physical values for the representative reactor coolant system for input to the second model means;

and the second model means generates data values relating to heat flux for the representative steam generators for input to the reactor coolant system thermal model means.

11. An automated training simulator according to claim 10, wherein the reactor coolant system thermal model means generates data values relating to specific volume; and the calculating means further include
model means responsive to the generated specific volume data values to generate data values relating to reactor coolant system fluid flow for input to the reactor coolant system thermal model means.

12. An automated training simulator according to claim 11 wherein said calculating means is structured in a programmed digital computer means.

13. An automated training simulator according to claim 10 wherein said calculating means is structured in a programmed digital computer means.

14. An automated training simulator according to claim 9; wherein the calculating means further includes
model means corresponding to the operation of an auxiliary feedwater system for generating data values relating to auxiliary feedwater flow and enthalpy for input to govern the second model means.

15. An automated training simulator according to claim 14 wherein said calculating means is structured in a programmed digital computer means.

16. An automated training simulator according to claim 9; wherein the calculating means further includes
model means for generating data values relating to the operation of a condensate and main feedwater system, said data values including data values relating to feedwater flow and enthalpy for input to govern the second model means.

17. An automated training simulator according to claim 16; wherein said calculating means is structured in a programmed digital computer means.

18. an automated training simulator according to claim 9; wherein the calculating means further includes
model means for generating data values relating to the efficiency of a steam operated boiler feedwater pump including data values relating to pump steam flow for input to the second model means.

19. An automated training simulator according to claim 18; wherein said calculating means is structured in a programmed digital computer means.

20. An automated training simulator according to claim 9; wherein the calculating means further includes
model means corresponding to the operation of a steam reheater, low pressure turbine, and feedwater heater thermal system to generate data values relating to inlet pressure of the representative reheater and shaft speed of the representative low pressure turbine for input to govern the second model means.

21. An automated training simulator according to claim 20; wherein said calculating means is structured in a programmed digital computer means.

22. An automated training simulator according to claim 9; wherein the calculating means further includes
model means to generate data vales relating to condensate and feedwater flow in response to input data values relating to steam pressure generated by the second model means.

23. An automated training simulator according to claim 22 wherein said calculating means is structured in a programmed digital computer means.

24. An automated training simulator according to claim 9; wherein the calculating means further includes
model means for generating data values relating to boiler feed pump speed, said model means being governed by data values relating to steam generator level error and steam dump controller error values generated by the second model means.

25. An automated training simulator according to claim 24 wherein said calculating means is structured in a programmed digital computer means.

26. An automated simulator according to claim 9 wherein the second model means generates data values relating to high pressure turbine exit temperature, pressure, flow, and high pressure turbine steam extraction temperature, flow, and shaft power; and the calculating means further includes
model means responsive to said last named data values for generating data values relating to the operation of the representative reheater, low pressure turbine and feedwater heater thermal systems.

27. An automated training simulator according to claim 26 wherein said calculating means is structured in a programmed digital computer means.

28. An automated simulator according to claim 9 wherein the second model means generates data values relating to a steam line break flow and enthalpy, and a feedwater line break flow and enthalpy; and the calculating means further includes
model means responsive to said last named generated data values to generate data values relating to pressure in a representative containment building for input to said second model means.

29. An automated training simulator according to claim 28 wherein said calculating means is structured in a programmed digital computer means.

30. An automated training simulator according to claim 9 wherein said calculating means is structured in a programmed digital computer means.

31. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising
a control console with a plurality of manually operable and automatic devices which correspond to distinct plant control devices to provide input data to predetermined models;
calculating means which includes sequence controlling means having the following components a. first model means to generate data values relating to the operation of a steam reheating means, low pressure turbine, and feedwater heater thermal system in accordance with data values relating to the operation of a steam generation means, main steam system and high pressure turbine,
b. second model means relating to the operation of the representative steam generating means, main steam system and high pressure turbine to generate data values including data values for input to the first model means relating to exit and extraction temperature, pressure, flow and shaft power of the high pressure turbine model means; and
indicating means responsive to predetermined generated data values for monitoring the operation of the plant represented by the models.

32. An automated training simulator according to claim 31; wherein the calculating means further includes
a. model means for generating data values relating to the operation of a main electrical generator, exciter, and regulator which is input to the first model means.

33. An automated training simulator according to claim 32 wherein said calculating means is structured in a programmed digital computer means.

34. An automated training simulator according to claim 31 wherein the first model means generates data values relating to steam flow and enthalpy of the representative low pressure turbine; and the calculating means further includes model means governed by the generated data probes from the first model means to generate data values including data values relating to pressure and air quantity in the operation of a representative steam condenser.

35. An automated training simulator according to claim 34 wherein said calculating means is structured in a programmed digital computer means.

36. An automated training simulator according to claim 31; wherein the calculating means further includes model means for generating physical values relating to feedwater and condensate flow for input to govern the first model means.

37. An automated training simulator according to claim 36 wherein said calculating means is structured in a programmed digital computer means.

38. An automated training simulator according to claim 31 wherein the first model means generates data values relating to the inlet and exit temperature, losses, and shaft speed of the representative low pressure turbine; and the calculating means further includes model means governed by said last named generated data values for generating data values relating to the vibration and casing temperature and bearing clearances of the representative high and low pressure turbines.

39. An automated training simulator according to claim 38 wherein said calculating means is structured in a programmed digital computer means.

40. An automated training simulator according to claim 31 wherein the first model means generates data values relating to inlet temperature and pressure of steam in the representative low pressure turbine; and the calculating means further includes model means for generating data values relating to high and low pressure turbine speed.

41. An automated training simulator according to claim 40 wherein said calculating means is structured in a programmed digital computer means.

42. An automated training simulator according to claim 31 wherein the first model means generates data values relating to low pressure turbine speed; and the calculating means further includes model means governed by said generated speed data to generate data values relating to representative gland steam, turbine oil, and generator cooling systems.

43. An automated training simulator according to claim 42 wherein said calculating means is structured in a programmed digital computer means.

44. An automated training simulator according to claim 31 wherein said calculating means is structured in a programmed digital computer means.

45. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising a control console with a plurality of manually operable and automatic devices which correspond to distinct plant control devices to provide input data to predetermined models;

calculating means which includes sequence controlling means having the following components (a) first model means governed by the operation of selected console devices corresponding to reactor control rod command devices for generating data values relating to cross sections of a representative nuclear reactor;

b. second model means governed by data values including data values generated by the first model means for generating data values relating to one dimension space time kinetics with delayed neutrons for one axis of the representative nuclear reactor, c. third model means governed by generated data values from the second model means to generate data values relating to the thermo-hydraulic operation of the representative nuclear reactor, d. fourth model means governed by data values relating to control rod operation and data values generated by the second model means to generate data values relating to physical variables along a second axis of the representative reactor; and indicating means responsive to selected generated data values for monitoring the operation of the representative reactor.

46. An automated training simulator according to claim 45 wherein the second model means is governed by data values generated by the first model means, said data values relating to coefficients of diffusion and absorption of crosssections, yield of neutrons, and energy and neutron velocities of the representative reactor.

47. An automated training simulator according to claim 46 wherein the third model means is governed by data values generated by the second model means, said data values including data values relating to total fission power of the representative reactor.

48. An automated training simulator according to claim 47; wherein the calculating means further includes a. fifth model means to generate data values relating to decay heat of a representative nuclear reactor for input to govern the second model means, and b. means responsive to the data values generated by the fifth model means and second model means to control the data values relating to nuclear reactor core total power for input to the third model means.

49. An automated training simulator according to claim 48; wherein the calculating means further includes a. model means for generating data values relating to xenon concentration in response to data values relating to neutron flux generated by the second model means for input to govern the first model means.

50. An automated training simulator according to claim 49 wherein said calculating means is structured in a programmed digital computer means.

51. An automated training simulator according to claim 46 wherein said calculating means is structured in a programmed digital computer means.

52. An automated training simulator according to claim 47 wherein said calculating means is structured in a programmed digital computer means.

53. An automated training simulator according to claim 48 wherein said calculating means is structured in a programmed digital computer means.

54. An automated training simulator according to claim 47 wherein first model means is governed by the neutron flux generated by the second model means.

55. An automated training simulator according to claim 54 wherein said calculating means is structured in a programmed digital computer means.

56. An automated training simulator according to claim 45; wherein the calculating means further includes
 a. fifth model means governed by data values including data values generated by the third model means to generate data values relating to the thermal operation of the reactor coolant system represented by the fifth model means for input to the first and third model means, and
 b. sixth model means governed by data values including data values generated by the fifth model means to generate data values relating to reactor coolant system fluid flow for input to govern the third model means.

57. An automated training simulator according to claim 56 wherein the data values generated by the third model means for input to govern the fifth model means include data values relating to enthalpy of fluid at the outlet of the representative nuclear reactor core, and
 wherein data values generated by the fifth model means for input to govern the first and third model means relate to inlet and outlet fluid enthalpy of the representative reactor core.

58. An automated training simulator according to claim 57 wherein said calculating means is structured in a programmed digital computer means.

59. An automated training simulator according to claim 56 wherein said calculating means is structured in a programmed digital computer means.

60. An automated training simulator according to claim 45 wherein said calculating means is structured in a programmed digital computer means.

61. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising
 a control console with a plurality of manually operable and automatic devices which correspond to distinct plant control devices to provide input data to predetermined models;
 calculating means which includes sequence controlling means having the following components a. first model means governed by data values including data values relating to specific volume of reactor coolant to generate data values relating to the dynamic operation of a reactor coolant system including data values relating to coolant flows in the loop of the representative reactor coolant system, and
 b. second model means to generate data values relating to the dynamic operation of the representative reactor coolant system including data values relating to specific volume of the reactor coolant for input to the first model means; and
 indicating means governed by generated data values from the first and second model means to monitor predetermined data values in the operation of the representative plant.

62. An automated training simulator according to claim 61; wherein the calculating means further includes
 third model means to generate data values relating to liquid flow and selected pressure in a representative residual heat removal system for input to govern the first model means.

63. An automated training simulator according to claim 62 wherein said calculating means is structured in a programmed digital computer means.

64. An automated training simulator according to claim 61; wherein the calculating means further includes
 a third model means to generate data values relating to flows of a representative accumulator safety injection system to govern the first model means, and the first model means generates data values for input to the third model means to generate data values relating to a representative chemical and volume control system including data values relating to charging, filler header flow, and enthalpy; and said second model means is governed by the generated data values from the third model means relating to accumulator flows and temperatures.

65. An automated training simulator according to claim 64 wherein said calculating means is structured in a programmed digital computer means.

66. An automated training simulator according to claim 61; wherein the calculating means further includes
 third model means governed by the first model means for generating data values relating to reactor core liquid flow.

67. An automated training simulator according to claim 66 wherein said calculating means is structured in a programmed digital computer means.

68. An automated training simulator according to claim 61; wherein the calculating means further includes
 third model means governed by data values generated by the first model means to generate data values relating to a representative accumulator safety injection system including pressures in the representative accumulator at selected locations.

69. An automated training simulator according to claim 68 wherein said calculating means is structured in a programmed digital computer means.

70. An automated training simulator according to claim 61; wherein the calculating means further includes
 third model means to generate data values relating to thermal hydraulic reactor values; and
 said second model means is governed by said data values generated by the third model means to generate data values including data values related to reactor core outlet fluid enthalpy.

71. An automated training simulator according to claim 70 wherein said calculating means is structured in a programmed digital computer means.

72. An automated training simulator according to claim 61; wherein the calculating means further includes third model means to generate data values relating to the operation of a pressurizer, and
said second model means is governed by the generated data values from the third model means to generate data values including data values relating to pressurizer pressure and surge enthalpy.

73. An automated training simulator according to claim 72 wherein the second model means generates data values relating to surge flow and enthalpy, spray enthalpy, and saturation pressure in the cold and hot legs of the representative reactor coolant system; and the calculating means further includes
fourth model means governed by said last named generated data values to generate data values relating to the dynamic operation of a pressurizer.

74. An automated training simulator according to claim 73 wherein said calculating means is structured in a programmed digital computer means.

75. An automated training simulator according to claim 72 wherein said calculating means is structured in a programmed digital computer means.

76. An automated training simulator according to claim 61; wherein the calculating means further includes
third model means to generate data values relating to conditions in a representative containment structure including data values relating to containment humidity, pressure, and temperature for input to govern the second model means.

77. An automated training simulator according to claim 76 wherein said calculating means is structured in programmed digital computer means.

78. An automated training simulator according to claim 61; wherein the calculating means further includes
third model means relating to the dynamic operation of steam generators, main steam system, and high pressure turbine, for generating data values relating to heat flux in the representative steam generators for input to govern the second model means.

79. An automated training simulator according to claim 78 wherein said calculating means is structured in a programmed digital computer means.

80. An automated training simulator according to claim 61; wherein the calculating means further includes
third model means relating to the dynamic operation of a high pressure head safety injection system to generate data values relating to flows and flow temperature for input to govern the second model means.

81. An automated training simulator according to claim 80 wherein said calculating means is structured in a programmed digital computer means.

82. An automated training simulator according to claim 61 wherein the second model means generates data values relating to reactor coolant system heat loss, and outflow enthalpy for a representative loss of coolant accident; and the calculating means further includes
third model means governed by said last named generated data values for generating data values relating to conditions in a representative reactor power plant containment vessel.

83. An automated training simulator according to claim 82 wherein said calculating means is structured in a programmed digital computer means.

84. An automated training simulator according to claim 61 wherein the second model means generates data values including data values relating to letdown tap pressure and enthalpy; and the calculating means further includes
third model means governed by said last named generated data values for generating data values relating to the dynamic operation of a chemical and volume control system.

85. An automated training simulator according to claim 84 wherein said calculating means is structured in a programmed digital computer means.

86. An automated training simulator according to claim 61 wherein the second model means generates data values including data values relating to safety injection system tap point pressures; and the calculating means further includes
third model means governed by said last named generated data values for generating data values relating at times to the operation of an accumulator safety injection system and at times to the operation of a high head safety injection system.

87. An automated training simulator according to claim 86 wherein said calculating means is structured in a programmed digital computer means.

88. An automated training simulator according to claim 61 wherin the second model means generates data values including data values relating to temperature changes, average temperature, and pressure for a representative reactor coolant system; and the calculating means further includes
third model means governed by said last named generated data values to generate data values relating to over-power and over-temperature protection.

89. An automated training simulator according to claim 88 wherein said calculating means is structured in a programmed digital computer means.

90. An automated training simulator according to claim 61 wherein the second model means generates data values including data values relating to reactor core inlet and outlet fluid enthalpy; and the calculating means further includes
third model means governed by said last named generated data values to generate data values relating to the operation of a reactor thermo-hydraulic system.

91. An automated training simulator according to claim 90 wherein said calculating means is structured in a programmed digital computer means.

92. An automated training simulator according to claim 61 wherein said calculating means is structured in a programmed digital computer means.

93. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising
a control console with a plurality of manually operable and automatic devices which correspond to distinct plant control devices to provide input data to predetermined models;
calculating means which includes sequence controlling means having a plurality of model means with each model means relating to the operation of individual representative safety injection systems for a nuclear power plant, and wherein said model means includes model means relating to a safety injection selection means operable to activate selectively any of the plurality of safety injection model means, said activated safety injection model means being operative to generate data values relating to the operation of the selected model means for input to other models; and indicating devices responsive to the generated data values from said other models for monitoring the operation of the plant.

94. An automated training simulator according to claim 93 wherein one of the plurality of safety injection model means is an individual model operative to generate data values including data values relating to pressure for a representative boron injection tank inlet, and the calculating means further includes model means governed by said generated boron injection data values to generate data values relating to the operation of a chemical and volume control system.

95. An automated training simulator according to claim 94 wherein said calculating means is structured in a programmed digital computer means.

96. An automated training simulator according to claim 93 wherein one of the plurality of safety injection model means is a model to generate data values relating to tap point pressures; another of the safety injection model means is a model governed by said last named generated data values to generate data values relating to the operation of a residual heat removal system including data values relating to safety injection flows and outlet temperatures for a representative residual heat removal heat exchanger means at times when the residual heat removal model means operates as part of the safety injection function.

97. An automated training simulator according to claim 96 wherein said calculating means is structured in a programmed digital computer means.

98. An automated training simulator according to claim 93 wherein one of the plurality of safety injection model means generates data values relating to tap point pressures for a model corresponding to a residual heat removal system; and the calculating means further includes containment model means to generate data values relating to pressure, containment sump enthalpy, and level of containment input to govern said safety injection model means at times when the representative safety injection system is governed to function as a containment sump recirculation and containment spray system.

99. An automated training simulator according to claim 98 wherein said calculating means is structured in a programmed digital computer means.

100. An automated training simulator according to claim 93; wherein the calculating means further includes a. model means corresponding to a residual heat removal system and heat exchanger to generate data values relating to flow, temperature, and pressure for selected points in a representative reactor coolant system;

and wherein one of the plurality of safety injection system model means is governed by said residual heat removal model generated data values to generate data values relating to safety injection pump suction pressure, and data values relating to flow and temperature at selected points in the representative reactor coolant system at times when the residual heat removal system model means is operated to remove excessive heat from the representative safety injection system flow.

101. An automated training simulator according to claim 100 wherein said calculating means is structured in a programmed digital computer means.

102. An automated training simulator according to claim 93 wherein said calculating means is structured in a programmed digital computer means.

103. An automated training simulator for the dynamic operation of a nuclear powered electrical generating plant wherein discrete selected portions of the representative plant are represented in a model that uses input data generated by other models to generated physical values that are used as input data by still other models, each model responds in a manner similar to the physical portion of the plant that it represents; comprising a control console with a plurality of manually operable devices which correspond to distinct plant control devices;

calculating means which includes sequence controlling means having the following components a. first model means relating to the operation of a nuclear reactor to generate data values including data values relating to reactor coolant enthalpy in accordance with data values including data values generated by the operation of the console devices corresponding to reactor rod control devices, b. second model means relating to the operation of a reactor coolant system to generate data values including data values relating to fluid temperature and enthalpy in accordance with data values including data values generated by the reactor model means, c. third model means relating to the operation of a steam turbine to generate data values including data values relating to steam turbine speed and power in accordance with input data values from the reactor coolant system model means, d. fourth model means relating to the operation of an electric generator to generate data values including data values relating to power and mechanical output in accordance with data values including data values generated by the steam turbine model means; and indicating devices governed by data values including the generated data values from the reactor, reactor coolant system, turbine, and generator model means to monitor corresponding portions of the representative plant.

104. An automated training simulator according to claim 103 wherein the calculating means for the reactor model means includes means to generate data values relating to reactor flux and temperature, and means governed by the generated data values relating to reactor flux and temperature to generate data values relating to reactor enthalpy.

105. An automated training simulator according to claim 104 wherein said calculating means is structured in a programmed digital computer means.

106. An automated training simulator according to claim 103 wherein the second model means generates data values relating to fluid flow and specific volume; and the calculating means further includes model means governed by said last named generated data value from the second model means to generate data values relating to reactor boron concentration and indicating means responsive to the generated boron concentration data values.

107. An automated training simulator according to claim 106; wherein the calculating means includes means governed by the generated data values relating to boron concentration to generate data values including data values relating to reactor coolant enthalpy.

108. An automated training simulator according to claim 107 wherein said calculating means is structured in a programmed digital computer means.

109. An automated training simulator according to claim 106 wherein said calculating means is structured in a programmed digital computer means.

110. An automated training simulator according to claim 103 wherein said calculating means is structured in a programmed digital computer means.

111. An automated training simulator for a nuclear powered electrical generating plant wherein discrete selected portions of the representative plant are each represented in a model that uses input data generated by other models to generate physical values that are used as input data by still other models, each model responds in a manner similar to the physical portion of the plant that it represents; comprising a control console with a plurality of manually operable devices corresponding to distinct plant control devices, calculating means which includes sequence controlling means having the following components a. first model means relating to the operation of a nuclear reactor governed by data values including data values from selected console control rod command devices to generate data values including data values relating to reactor coolant enthalpy, b. second model means relating to the operation of a reactor coolant system governed by said last named generated data values generated by the first model means to generate data values relating to reactor coolant system fluid temperature, c. third model means relating to the operation of a secondary system governed by data values including said last named data values generated by the second model means to generate data values including steam turbine speed and mechanical power, d. fourth model means relating to the operation of an electric generator governed by data values including said last named data values generated by the third model means to generate data values relating to power output; and indicating devices to monitor the operation of the representative plant in accordance with the generated data values.

112. An automated training simulator according to claim 111 wherein said calculating means is structured in a programmed digital computer means.

* * * * *